(12) United States Patent
Teddy et al.

(10) Patent No.: US 12,242,397 B1
(45) Date of Patent: Mar. 4, 2025

(54) SYSTEM AND METHOD FOR REPLAY OF PERIPHERAL DEVICE ATTACKS

(71) Applicant: FireEye Security Holdings US LLC, Milpitas, CA (US)

(72) Inventors: John Teddy, Missoula, MT (US); Imityaz Yunus Pathan, Maharashtra (IN); Raja Kannan, Bangalore (IN); Vinoo Thomas, Tami Nadu (IN); Rajendra Kumar Sharma, Bangalore (IN)

(73) Assignee: Musarubra US LLC, Plano, TX (US)

( * ) Notice: Subject to any disclaimer, the term of this patent is extended or adjusted under 35 U.S.C. 154(b) by 180 days.

(21) Appl. No.: 17/989,488

(22) Filed: Nov. 17, 2022

Related U.S. Application Data

(60) Provisional application No. 63/401,505, filed on Aug. 26, 2022.

(51) Int. Cl.
G06F 13/10 (2006.01)
(52) U.S. Cl.
CPC .... G06F 13/105 (2013.01); *G06F 2213/0042* (2013.01); *G06F 2213/40* (2013.01)
(58) Field of Classification Search
CPC ........... G06F 13/105; G06F 2213/0042; G06F 2213/40
See application file for complete search history.

(56) References Cited

U.S. PATENT DOCUMENTS

| 7,082,598 B1 * | 7/2006 | Le | G06F 9/4413 703/21 |
| 2008/0162741 A1 * | 7/2008 | Christison | G06F 13/387 710/16 |
| 2012/0331202 A1 * | 12/2012 | Cohen | G06F 13/102 710/313 |
| 2015/0261697 A1 * | 9/2015 | Christian | G06F 13/107 703/25 |
| 2019/0042805 A1 * | 2/2019 | Desai | G06F 21/57 |
| 2019/0082141 A1 * | 3/2019 | Chen | H04N 7/104 |

FOREIGN PATENT DOCUMENTS

EP 2678781 B1 * 9/2017 ............. H04L 67/08

* cited by examiner

*Primary Examiner* — Farley Abad
(74) *Attorney, Agent, or Firm* — Rutan & Tucker, LLP

(57) ABSTRACT

Disclosed herein is a computerized method for emulating processing of a peripheral device including operations of providing an insertion emulation signal to a computing device emulating insertion of the peripheral device to a port of the computing device, intercepting a request for a device descriptor of the peripheral device from a PnP manager operating on the computing device, providing a device descriptor of the peripheral device to the PnP manager, wherein the PnP manager is configured to enumerate the emulated peripheral device, intercepting one or more universal serial bus (USB) request blocks (URBs) from the PnP manager, and responsive to each of the one or more URBs, providing a response to the PnP manager. The insertion emulation signal may emulate a voltage transition on a data line of the port of the computing device. The peripheral device may adhere to a USB standard.

17 Claims, 14 Drawing Sheets

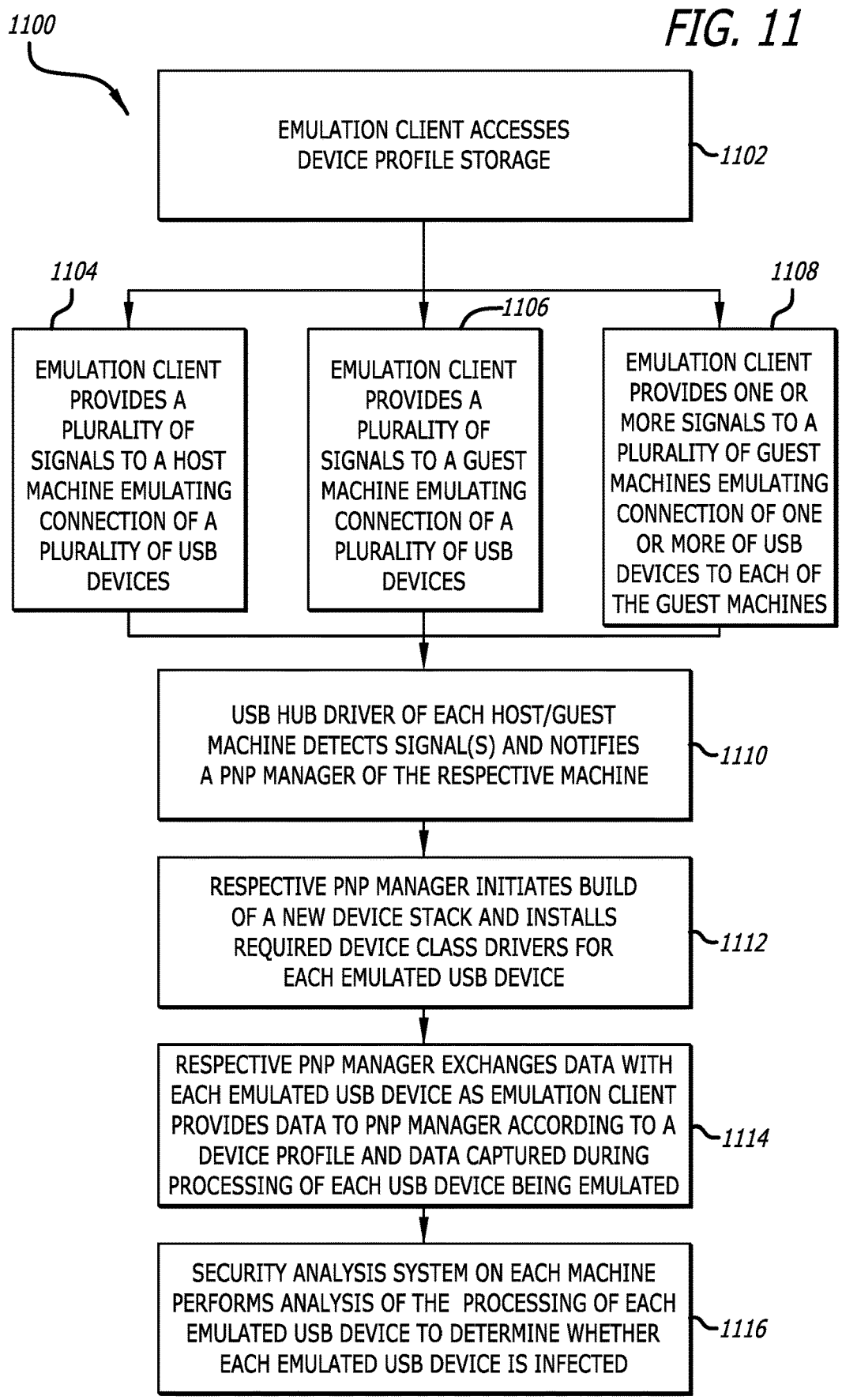

1202 OBTAIN TRAINING DATA INCLUDING DEVICE PROFILES COMPUTING DEVICE DESCRIPTOR STRUCTURES AND DATA CAPTURED DURING PROCESSING OF THE USB DEVICES REPRESENTED BY THE DEVICE PROFILES

1204 OBTAIN LABELING OF AT LEAST A PORTION OF THE TRAINING DATA

1206 TRAIN A MACHINE LEARNING (ML) MODEL THROUGH EXECUTION OF A MACHINE LEARNING ALGORITHM USING THE TRAINING DATA AS INPUT, WHERE THE TRAINED ML MODEL IS CONFIGURED TO PROVIDE A PREDICTION AS TO WHETHER A USB DEVICE IS INFECTED

1212 INCORPORATE USER FEEDBACK INTO TRAINING DATA

1208 APPLY TRAINED ML MODEL TO A SECOND PORTION OF THE TRAINING DATA TO OBTAIN PREDICTIONS

1210 OBTAIN USER FEEDBACK AS TO ACCURACY OF PREDICTION

1214 STORE TRAINED ML MODEL

1216 APPLY TRAINED ML MODEL TO THE DEVICE PROFILE OF A SUBSEQUENT USB DEVICE AND THE DATA CAPTURED DURING THE PROCESSING THEREOF

SYSTEM AND METHOD FOR REPLAY OF PERIPHERAL DEVICE ATTACKS

CROSS-REFERENCE TO RELATED APPLICATIONS

This application claims the benefit of priority on U.S. Provisional Patent Application No. 63/401,505, titled "System and Method for Replay of Peripheral Device Attacks," filed Aug. 26, 2022, the entire contents of which is incorporated herein by reference.

FIELD

Embodiments of the disclosure generally relate to the field of exploit or malware detection to be distributed via a peripheral device. One embodiment relates to emulation of a peripheral device by providing stored device profile data to drivers and logic operating on a computing device to determine whether a security system of the computing device is capable of detecting whether the peripheral device being emulated is malicious.

GENERAL BACKGROUND

Computing devices often operate based on user input provided from a plurality of peripheral devices connected to the computing device. Examples of well-known peripheral devices include mice, keyboards, printers, monitors, webcams, speakers, etc. Thus, in order for a user to interact with a computing device and carry out many necessary functions, peripheral devices are required. Peripheral devices may be coupled with a computing device in a variety of methodologies such as wired or wireless. Additionally, a peripheral device is enumerated or otherwise configured by the computing device such that data may be exchanged therebetween. Without enumeration or configuration and an established communication protocol known to both the peripheral device and the computing device, data will not be properly exchanged.

There are numerous industry standards for communication protocols. For example, Universal Serial Bus (USB) is one such standard that sets forth a specification for cables and connectors, and connection and communication protocols. Many peripheral devices are manufactured and configured with hardware, software, and/or firmware in accordance with a version of the USB standard (e.g., USB 2.0, USB 3.0, USB 4.0) ("USB Devices").

Further, today's operating systems running on computing devices are also configured to automatically detect and enumerate USB devices. In fact, many operating systems and computing devices are configured with "plug-and-play (PnP)" functionality, which is a combination of hardware and software that automatically detects and enumerates USB devices with little or no user involvement. Thus, as is often the case today, a user may plug a USB device into a computing device and, without any user involvement, the computing device obtains or installs certain drivers (software) and creates a profile for the USB device, which enables the user almost instantaneous access to use the peripheral device.

Although the plug-and-play functionality, and the detection and enumeration of USB devices generally, provides for a convenient, easy-to-use experience for a user, USB software or firmware is inherently vulnerable to exploits during or as a result of the detection and enumeration process. For example, an exploit may include malicious software that is installed without user knowledge during the auto-detection and enumeration process of a USB device ("an infected USB device" or "a malicious USB device"). Once installed, the exploit may manipulate and reprogram the USB device, causing it to act as a human interface device (HID) and discreetly execute commands or run malicious programs on the computing device. One illustrative example is the "Do It Yourself" Rubber Ducky USB exploit, which is a commercial hacking package that may inject upwards of 1,000 words per minute into a computing device once the exploit is installed.

Other exploits include the use of social engineering techniques to disguise themselves as legitimate files. For example, the detection and enumeration process for an infected USB device may result in the appearance of a file such as a booby-trapped binary or script on the computing device. When a user opens the booby-trapped binary or script, a malicious payload is executed resulting in anomalous or malicious operations such as establishing a connection with a command-and-control (CnC) server that subsequently exchanges data with the computing device, often seeking to extract sensitive information.

As many enterprises adopted a practice of Bring Your Own Devices (BYOD) allowing employees to bring their own devices such as USB devices into an office or otherwise with a computing device that connects to an enterprise network, enterprise networks have become vulnerable to USB exploits. Thus, what is needed is a system and methodology configured to detect, alert, and preview malicious actions originating from USB devices without providing an unverified USB device access to the computing device or enterprise network while also avoiding limitations on employee productivity.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 11 is a flowchart illustrating a methodology of emulating a peripheral device in accordance with a stored peripheral device profile on either a host machine or a guest machine in accordance with some embodiments; and FIG. 12 is a flowchart illustrating a methodology of training a machine learning model to detect whether a peripheral device is infected in accordance with some embodiments.

DETAILED DESCRIPTION

Figure 1A:
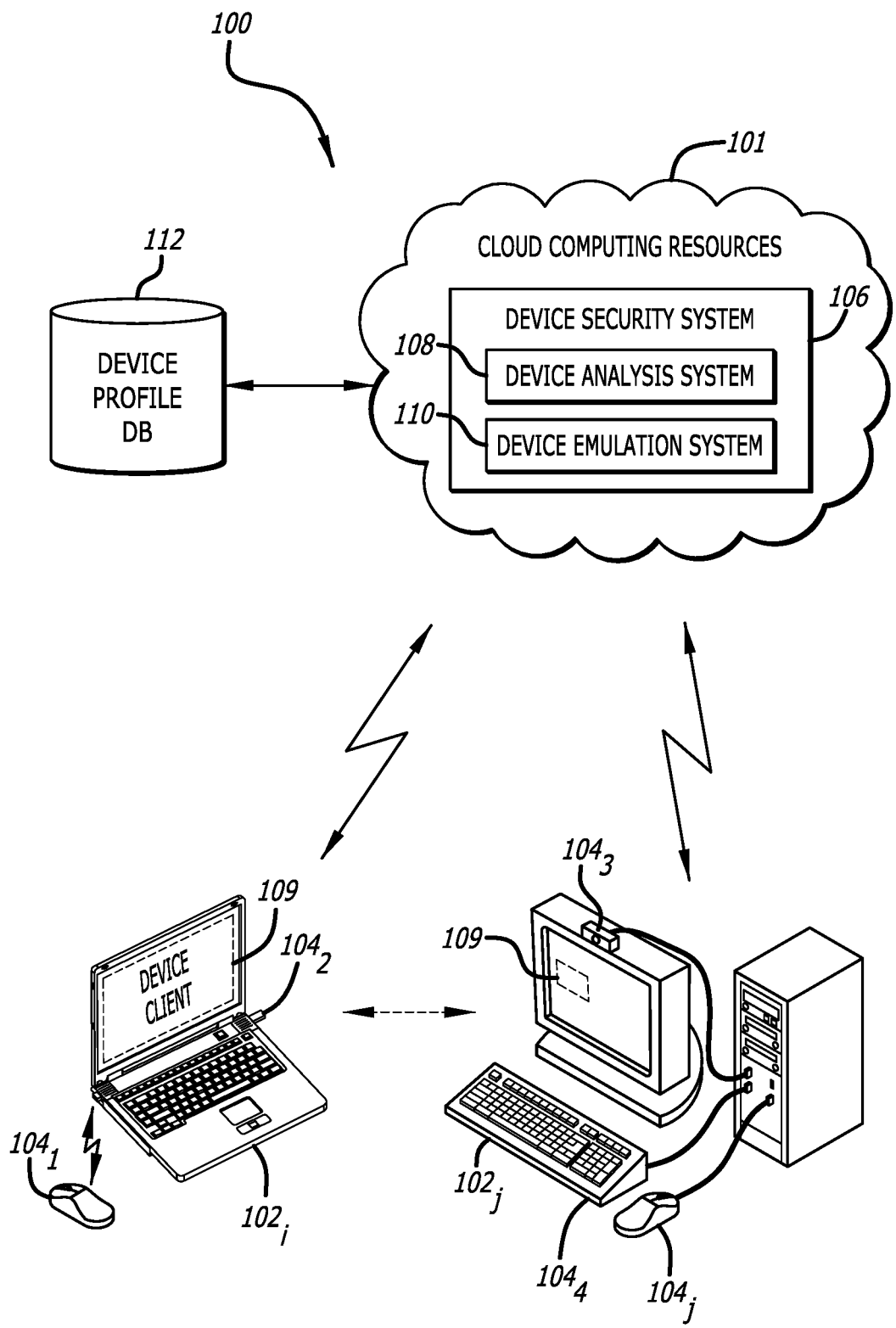
FIG. 1A is a block diagram illustrating a networking environment featuring computing devices that are each connected to one or more peripheral devices, where each computing device has a device client processing thereon and is in communication with a device security system operating within cloud computing resources in accordance with some embodiments.

Various embodiments of the disclosure relate to a security system comprising logic and/or hardware operating in cooperation with client (logic) processing on a computing device to automatically detect the coupling of a peripheral device with the computing device, intercept a data exchange between the peripheral device and a plug-and-play manager (logic) processing on the computing device, and analyze the peripheral device to determine whether the peripheral device is infected prior to permitting enumeration of the peripheral device. More specifically, embodiments of the disclosure include operations of interrupting enumeration and installation of a peripheral device, such as a USB device, upon insertion of the peripheral device into a port of a computing device. Additionally, the disclosure includes further operations of redirecting data provided by the peripheral device to a sandboxed environment for processing and analysis. In some embodiments, the sandboxed environment includes as a hypervisor and one or more virtual machines that seek to exchange data with the USB device through various USB drivers and a client processing on the computing device. The data exchanged may then be used to detonate (commence operations of) any activities or operations of the USB device within a virtual machine. The performed operations within the virtual machine are monitored, and an analysis determines whether such operations constitute anomalous or malicious behavior and/or whether such operations are indicative of an infected USB device.

As discussed in detail below, typically, a plug-and-play (PnP) manager operating as part of the operating system of the computing device is configured to detect the insertion of a new USB device. Upon detecting insertion of the USB device, the PnP manager builds a new device stack and installs its device class driver so that the USB device can perform data transfer with the computing device. However, this installation is the first phase where an exploit may be introduced to the computing device.

Embodiments discussed below include operations of interrupting the building of a device stack and installation of drivers. By interrupting the device installation and/or device stack build on the computing device and instead redirecting data from the USB device to a virtual machine, installation of a malicious payload within drivers of the USB device on the computing device may be prevented.

In some embodiments, a driver operating on the computing device (a hub filter driver) intercepts the PnP manager's request for a device descriptor that is transmitted to a USB device upon detecting that the USB device was inserted into the computing device. According to one embodiment of the disclosure, the request may be a "DEVICE_RELATIONS" Input/Output Request Packet (IRP). Interception of this IRP prevents the PnP manager from receiving device descriptors, which prevents a new device stack build and installation of device class drivers for the USB device on the computing device. As a result, the USB device is unable to interact with the computing device and thus, cannot cause installation of any malicious payload on the computing device.

Upon intercepting the request, the hub filter driver collects the device descriptors from the USB device and transmits them to the device security system (e.g., to a hypervisor, an instantiated virtual machine, and/or specifically to the virtual machine's virtual host controller). The virtual host controller initiates a new device stack build within the virtual machine by providing a DEVICE_RELATIONS IRP to the virtual machine's PnP manager. The virtual host controller utilizes the USB device's device descriptors for device class driver installation within the operating system of the virtual machine. Operating within the virtual machine, the USB class device driver initiates instructions to the USB device via USB Request Blocks (URBs), which are transmitted to the hub filter driver of the computing device and subsequently to the USB device for completion. The virtual processing of the USB device within the virtual machine is analyzed to determine whether the USB is infected (e.g., anomalous or malicious) or clean. Prior to a determination that the USB device is clean (i.e., uninfected), the device descriptors of USB device are withheld from the PnP manager such that a new device stack build and install of relevant drivers cannot occur on the computing device.

As should be realized, USB-based exploits are unlikely to be detected by today's current endpoint security products since the attack will not always involve file, registry, or network activity (which is often what is analyzed by today's current endpoint security products). For instance, traditional endpoint security products are unable to distinguish Input/Output (I/O) activities initiated by a legitimate user and those initiated by a malicious USB device. As a result, I/O activities initiated by a malicious USB device typically go undetected by today's current endpoint security products.

As will be discussed below, the device security system including the emulation logic may be hosted on the cloud computing resources, on on-premise resources hosted on a local machine, local network, or remote network.

I. Terminology

In the following description, certain terminology is used to describe features of the invention. For example, in certain situations, the terms "component" and "logic" are representative of hardware, firmware or software that is configured to perform one or more functions. As hardware, a component (or logic) may include circuitry having data processing or storage functionality. Examples of such circuitry may include, but are not limited or restricted to, a hardware processor (e.g., microprocessor with one or more processor cores, a digital signal processor, a programmable gate array, a microcontroller, an application specific integrated circuit "ASIC", etc.), a semiconductor memory, or combinatorial elements.

A component (or logic) may be software in the form of a process or one or more software modules, such as executable code in the form of an executable application, an API, a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to, a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage. Upon execution of an instance of a system component or a software module, a "process" performs operations as coded by the software component.

The term "object" generally refers to a collection of data, whether in transit (e.g., over a network) or at rest (e.g., stored), often having a logical structure or organization that enables it to be classified for purposes of analysis for a presence of an exploit and/or malware. During analysis, for example, the object may exhibit certain expected characteristics (e.g., expected internal content such as bit patterns, data structures, etc.) and, during processing, a set of expected behaviors. The object may also exhibit unexpected characteristics and a set of unexpected behaviors that may offer evidence of the presence of malware and potentially allow the object to be classified as part of a malicious attack.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to individual or a number of packets carrying related payloads, e.g., a single webpage received over a network. Moreover, an object may be a file retrieved from a storage location over an interconnect.

As a self-contained element, the object may be an executable (e.g., an application, program, segment of code, dynamically link library "DLL", etc.) or a non-executable. Examples of non-executables may include a document (e.g., a Portable Document Format "PDF" document, MICROSOFT® OFFICE® document, MICROSOFT® EXCEL® spreadsheet, etc.), an electronic mail (email), downloaded web page, or the like.

The term "event" should be generally construed as an activity that is conducted by a software component process performed by the computing device. The event may occur that causes an undesired action to occur, such as overwriting a buffer, disabling a certain protective feature in the guest environment, or a guest OS anomaly such as a guest OS kernel trying to execute from a user page.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify, or delete data. Malware may also correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

The term "computing device" should be generally construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: an endpoint device (e.g., a laptop, a smartphone, a tablet, a desktop computer, a netbook, a medical device, or any general-purpose or special-purpose, user-controlled electronic device configured to support virtualization); a server; a mainframe; a router; or a security appliance that includes any system or subsystem configured to perform functions associated with malware detection and may be communicatively coupled to a network to intercept data routed to or from an endpoint device.

The term "message" generally refers to information transmitted in a prescribed format, where each message may be in the form of one or more packets or frames, a Hypertext Transfer Protocol (HTTP) based transmission, or any other series of bits having the prescribed format. For instance, a message may include an electronic message such as an electronic mail (email) message; a text message in accordance with a SMS-based or non-SMS based format; an instant message in accordance with Session Initiation Protocol (SIP); or a series of bits in accordance with another messaging protocol exchanged between software components or processes associated with these software components.

The term "interconnect" may be construed as a physical or logical communication path between two or more computing devices. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

The term "computerized" generally represents that any corresponding operations are conducted by hardware in combination with software and/or firmware. Also, the term "client" should be interpreted as a software component that is configured to be executed by one or more processors. The client may operate within either of the user or kernel modes of an operating system and may communicate (e.g., exchange data) with software applications or other logic modules. In some instances, a client may correspond to a driver operating in the user mode of the operating system of a computing device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Network Architecture

Referring to FIG. 1A, a block diagram illustrating a networking environment featuring computing devices that are each connected to one or more peripheral devices is shown in accordance with some embodiments, where each computing device has a device client processing thereon and is in communication with a device security system operating within cloud computing resources. The networking environment 100 may include a public network and/or a private network (e.g., an organization or enterprise network). For example, the public network may represent a portion of the internet and encompass cloud computing resources 101 ("the cloud").

The networking environment 100 is shown to include at least the cloud 101 and one or more computing devices $102_1$-$102_j$, where any individual computing device may be referred to as "a computing device 102" and any collection of computing devices may be referred to as "the computing devices 102." The networking environment 100 includes a device security system 106 processing on the cloud 101, with the device security system 106 including a device analysis subsystem 108 and a device emulation subsystem 110. The device security system 106 may access a device profile database 112, which in some embodiments, may be a component of the device security system 106 and be stored on the cloud 101. In other embodiments, the device profile database 112 may be stored elsewhere, e.g., on on-premise ("on-prem") resources (e.g., storage and/or computing resources such as hardware/software processors), such as at particular physical location of an enterprise (see FIG. 1B).

Each computing device 102 includes an instance of a device client 109 processing thereon that is configured to communicate with the device security system 106, intercept certain data communications intended to be exchanged between a peripheral device $104_1$-$104_j$ ("peripheral device 104" or "peripheral devices 104") and a plug-n-play (PNP) manager (e.g., a logic module) processing on the computing device 102. Although detailed embodiments discussed herein refer to the peripheral device 104 as a Universal Serial Bus (USB) device (e.g., a peripheral device that adheres to a USB standard), the disclosure is not intended to be so limited. In particular, interception of data provided by peripheral devices that adhere to other protocol standards may be performed in the same manner as discussed with USB devices (e.g., peripheral devices that adhere to a BLUETOOTH® standard). Further, operations performed by the emulation logic (and other logic components disclosed here) may be performed similarly to respond to data provided by a peripheral device. For instance, the device client 109 (and/or a driver of the computing device, separately or in combination with the device client 109) may intercept data provided by the peripheral device 104 and provide that intercepted data to the emulation logic 212 (see FIG. 2A), thus, preventing the PnP manager 206 (see FIG. 2A) from detecting the insertion of the peripheral device 104. Further, the emulation logic 212 may provide a response to the intercepted data to the client device 109, which is relayed to the peripheral device 104. The exchange/interception of data between the peripheral device 104 and the emulation logic 212 may be continue until a determination is made as to whether the peripheral device 104 is infected (e.g., includes malicious or anomalous firmware).

The computing devices 102 may communicate with the cloud by exchanging messages (e.g., packets or data in a prescribed format) according to a predefined set of protocols, such as the Transmission Control Protocol/Internet Protocol (TCP/IP). However, it should be noted that other protocols, such as the HyperText Transfer Protocol Secure (HTTPS) for example, may be used with the inventive aspects described herein.

As should be understood, the illustrative representation of the computing devices 102 is intended to include one or more hardware processors, a memory (e.g., non-transitory, computer-readable medium), and one or more network interfaces (referred to as "network interface(s)"). These components are at least partially encased in a housing of the computing device, which is made entirely or partially of a rigid material (e.g., hardened plastic, metal, glass, composite, or any combination thereof) that protects these components from atmospheric conditions.

The hardware processor may be a multipurpose, programmable device that accepts digital data as input, processes the input data according to instructions stored in its memory, and provides results as output. One example of the hardware processor 210 may include an INTEL® x86 central processing unit (CPU) with an instruction set architecture. Alternatively, the hardware processor may include another type of CPU, a digital signal processor (DSP), an ASIC, a field programmable gate array (FPGA), or the like. The network interface may be known to include a modem or one or more network ports containing the mechanical, electrical and/or signaling circuitry needed to connect the computing device 102 to a public/private network and/or the cloud 101 to thereby facilitate communications over a network or to the cloud 101. To that end, the network interface(s) may be configured to transmit and/or receive messages using a variety of communication protocols including, inter alia, TCP/IP and HTTPS.

Memory of any of the computing devices 102, the cloud 101 and/or the on-prem resources 114 may include a plurality of locations that are addressable by a hardware processor and the network interface(s) for storing software (including software applications) and data structures associated with such software. These components may be operable within one or more virtual machines that are generated and configured by emulation logic (e.g., a hypervisor as shown in FIG. 2B).

Figure 1B:
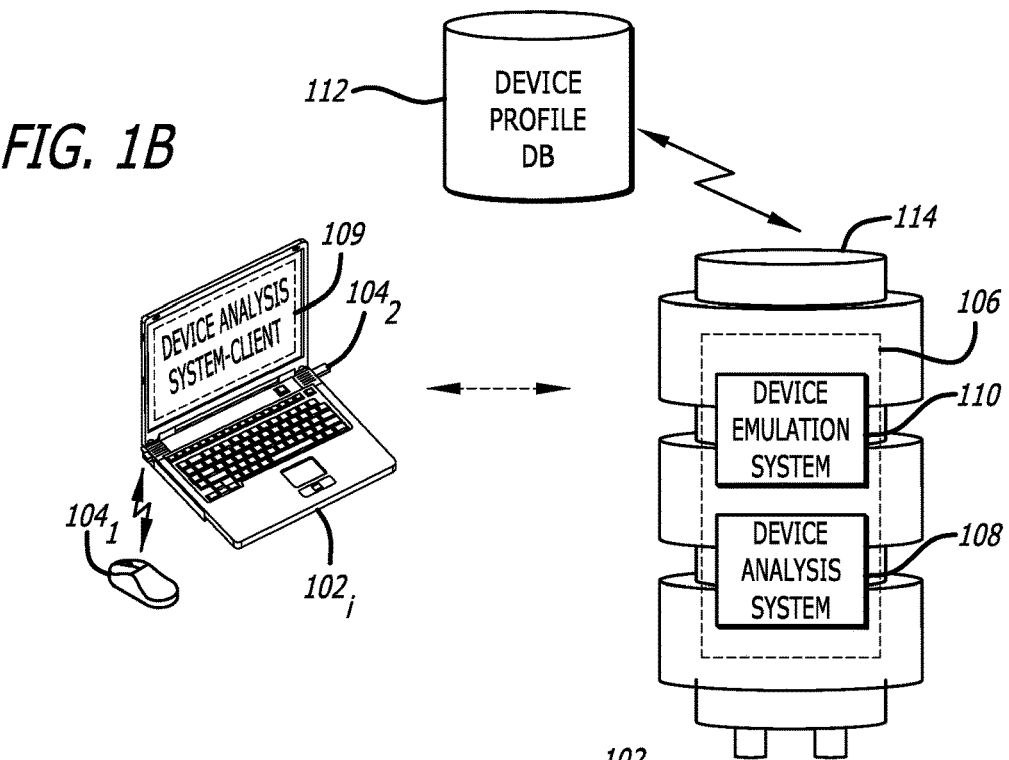
FIG. 1B is a block diagram illustrating a networking environment featuring a computing device connected to one or more peripheral devices, where the computing device includes a device client processing thereon and is in communication with a device security system operating on on-prem resources in accordance with some embodiments.

Referring to now FIG. 1B, a block diagram illustrating a networking environment featuring a computing device connected to one or more peripheral devices is shown in accordance with some embodiments, where the computing device includes a device client processing thereon and is in communication with a device security system operating on on-prem resources. FIG. 1B illustrates an alternative embodiment of the network environment 100 of FIG. 1A, where multiple components are included in both FIGS. 1A-1B. It will be appreciated that many of the illustrated embodiments provided herein may have analogous features. Accordingly, like features are designated with the same reference numerals and relevant disclosure set forth describing one figure may not be repeated thereafter. Moreover, specific features or components of the networking environment 100 may not be shown or identified by a reference numeral in subsequent drawings or specifically discussed in the written description that follows. However, such features may clearly be the same, or substantially the same, as features depicted in other embodiments and/or described with respect to such embodiments. Accordingly, the relevant descriptions of such features with respect to one embodiment apply equally to such features or components illustrated in other embodiments. Any suitable combination of the features, and variations of the same, described with respect to one figure or set of figures may be employed with a second figure or set of figures, and vice versa (e.g., such may be the case with embodiments illustrated in each of FIGS. 1A-7 and 8-12).

In particular, FIG. 1B provides an illustration that the device security system 106 may process on on-prem resources 114. In such embodiments, the computing device 102 may be communicatively coupled to the on-prem resources through a private network, e.g., a private enterprise network. Thus, the embodiment of FIG. 1B may operate and function in the same manner as the embodiment of FIG. 1A with data exchanged between the computing device 102 and the on-prem resources 114 over a network as detailed below.

Figure 1C:
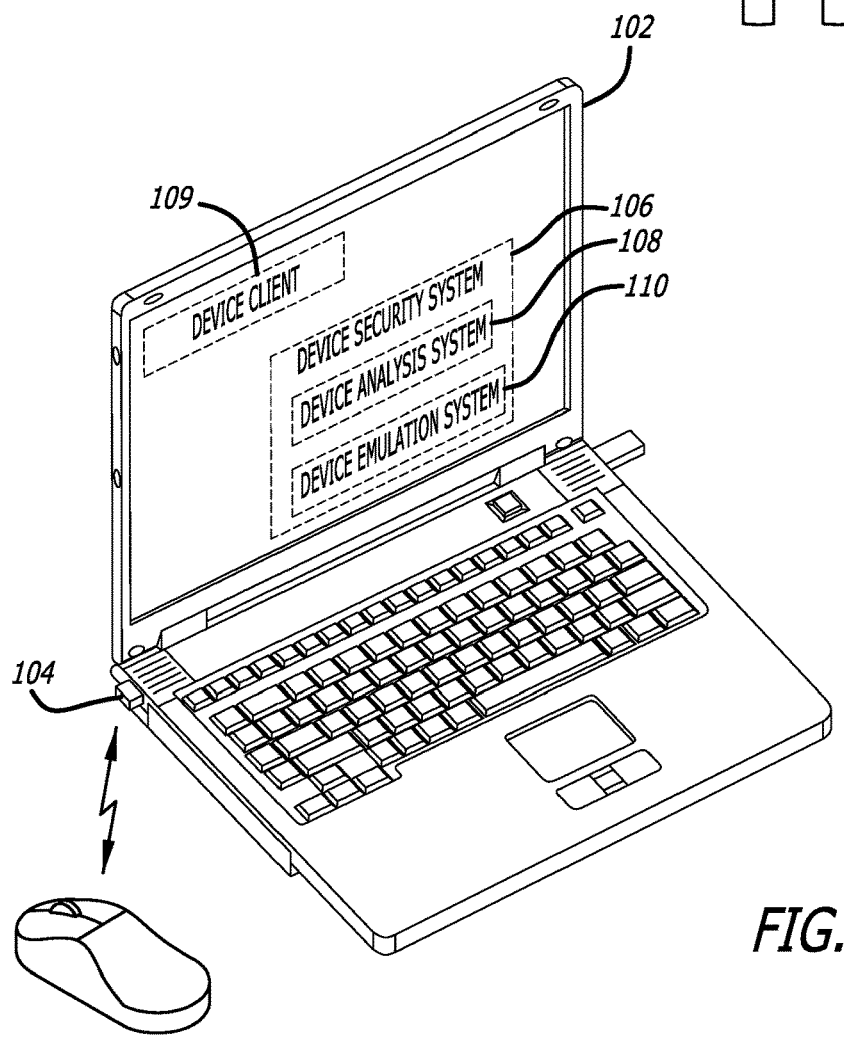
FIG. 1C is a block diagram illustrating a networking environment featuring a computing device connected to one or more peripheral devices, where the computing device includes a device client and a device security system operating processing thereon in accordance with some embodiments.

Referring now to FIG. 1C, a block diagram illustrating a networking environment featuring a computing device connected to one or more peripheral devices is shown in accordance with some embodiments, where the computing device includes a device client, and a device security system operating processing thereon. FIG. 1C provides an alternative embodiment to that of either of FIGS. 1A-1B. Specifically, FIG. 1C illustrates that the device client 109 and the device security system 106 may both operate on the computing device 102. The embodiment of FIG. 1C functions in a similar manner as that of FIGS. 1A-1B, where data is exchanged between the device client 109 and the device security system 106. Differently, the data exchange of FIG. 1C need not occur over a network connection.

It should be understood that the description of the functionalities of the device client 109 and the device security system and the operations performed thereby provided below may apply equally to each of the embodiments illustrated in FIGS. 1A-1C. One of ordinary skill will understand that where discussion includes reference to transmission of data over a network, such may not be needed in the embodiment illustrated in FIG. 1C.

III. Detection of Anomalous Peripheral Device Activities

1. Device Analysis System and Device Client Architecture

Figure 2A:
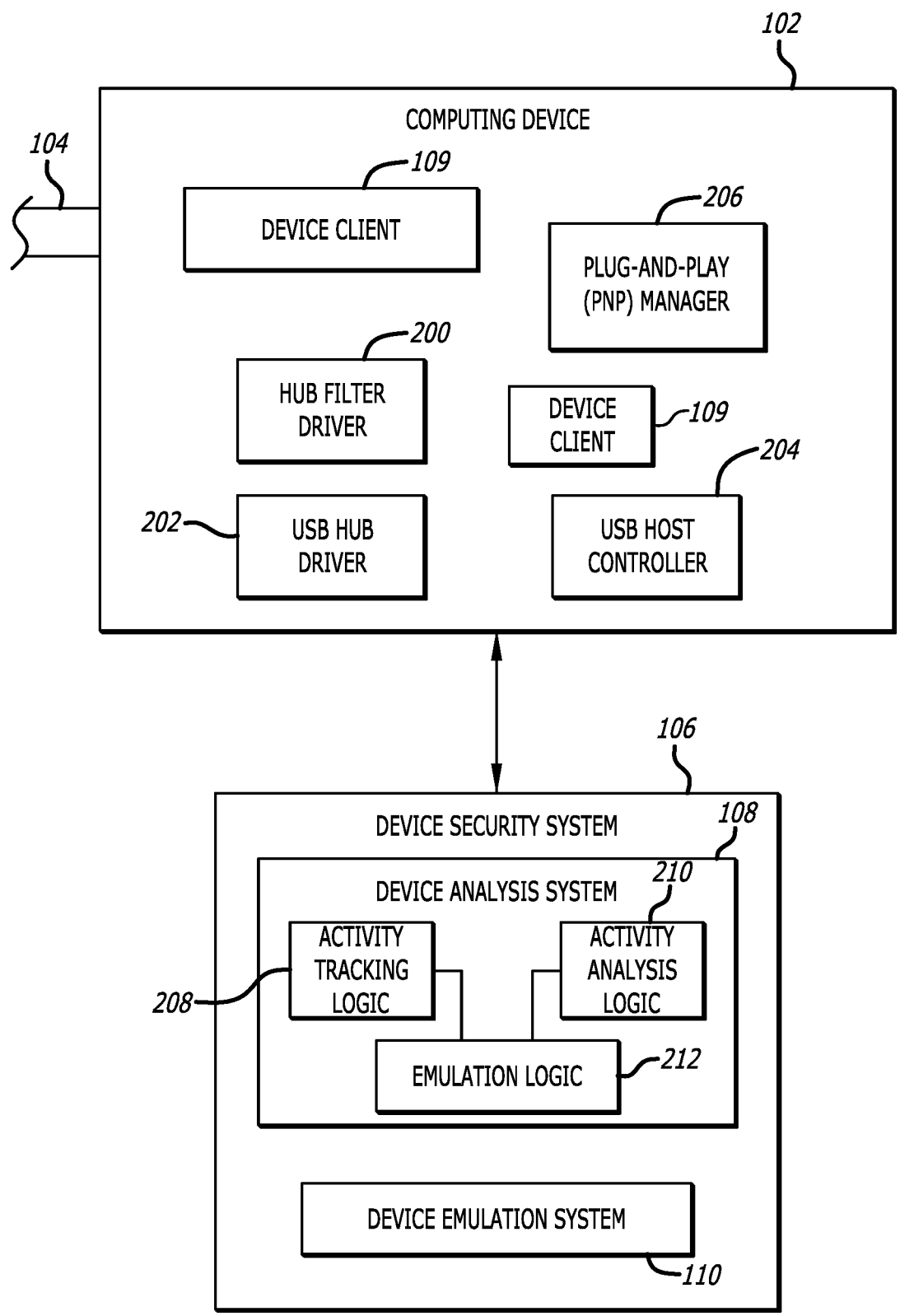
FIG. 2A is a block diagram illustrating a networking environment featuring a peripheral device connected to a computing device with the computing device including a device client operating thereon that is in communication with a device security system in accordance with some embodiments.
Figure 2B:
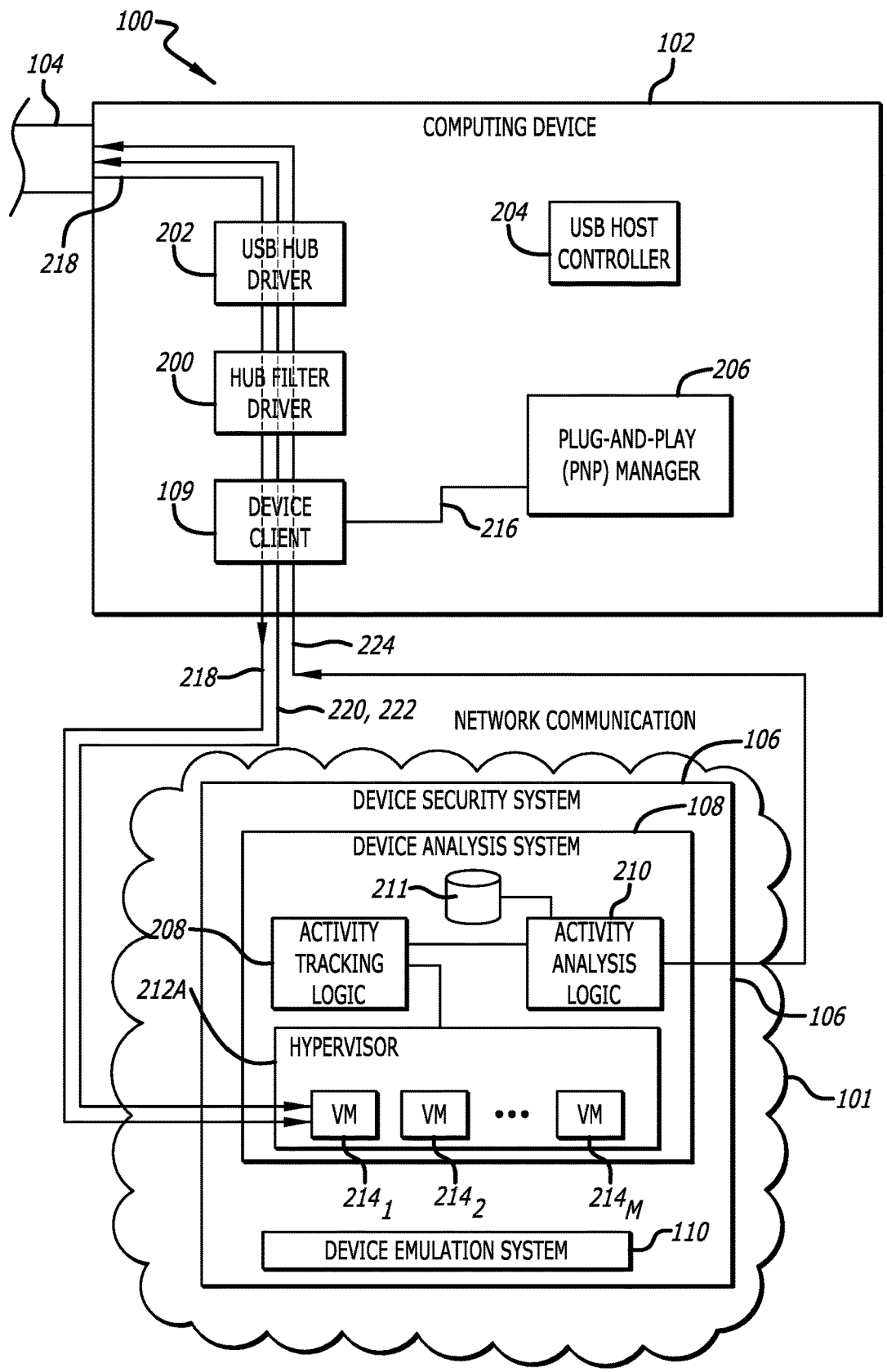
FIG. 2B is a block diagram illustrating the networking environment of FIG. 2A featuring the device security system implemented in cloud computing resources and emulation logic implemented as a hypervisor and one or more virtual machines in accordance with some embodiments.

Referring now to FIG. 2A, a block diagram illustrating a networking environment featuring a peripheral device connected to a computing device with the computing device including a device client operating thereon that is in communication with a device security system is shown in accordance with some embodiments. FIG. 2A illustrates certain aspects of the networking environment 100 of FIG. 1A-1C in more detail. Specifically, FIG. 2A illustrates that the computing device 102 is configured with specific logic including a device client 109, a hub filter driver 200, a USB hub driver 202, a USB host controller 204, and a plug-and-play (PnP) manager 206.

The device client 109 is configured to, upon execution by one or more processors, perform multiple sets of operations including establishing a secure network connection with a hypervisor (deployed as the emulation logic 208, see FIG. 2B). In embodiments where the device security system 106 is operating on the computing device 102 (i.e., FIG. 1C) and where the emulation logic 208 is deployed as a hypervisor and one or more virtual machines, the device client 109 is configured to establish a socket connection using a loopback address (e.g., often this address is an internet protocol address of 127.0.0.1). In these embodiments, two types of messages are transferred over the socket connection: (i) control messages, such as new-device notifications and verdicts, and (ii) input/output (IO) messages, such as URBs requested by the virtual machine.

A second set of operations performed by the device client 109 includes obtaining verdicts from the emulation logic 208 (e.g., hypervisor 280A) and providing notices to the hub-filter-driver 200. In some instances, the notices may be either to allow or deny the USB device 104 to be configured and established (e.g., through Allow/Deny IOCTL system calls).

A third set of operations performed by the device client 109 includes providing alerts to an administrator and/or user of the computing device 102 when the verdict indicates that the USB device 104 is infected (e.g., performing anomalous and/or malicious operations). In some instances, the device client 109 may be referred to as referred to a user-mode-service.

In some embodiments, the hub filter driver 200 is configured to perform particular operations including populating the USB device 104 with an empty hardware identifier and unknown compatible identifiers ("USB\UNKNOWN"), which causes the computing device 102 to perceive the USB device 104 as being in a disabled state. Stated differently, by populating the USB device 104 with the empty hardware identifier and unknown compatible identifier, the computing device 102 views the USB device 104 as an invalid peripheral device and thus, the PnP manager 206 does not exchange data therewith and the operating system of the computing device cannot install any drivers for the USB device 104.

Additionally, the hub filter driver 200 performs pass-through operations that include passing USB Request Blocks (URBs) that originate from the emulation logic 208 to actual the USB device 104. A URB is a variable-length data structure that begins with a header, which identifies a request from the emulation logic 208 for the USB device 104. A URB also includes a function member, which includes a particular system-defined constant that represents the requested operation to be performed by the USB device 104. Examples of possible requested options include control, bulk/interrupt, and isochronous transfers. A URB also includes a status member, which is updated by the USB device 104 upon completion of the requested operation. The URB is then returned to the emulation logic 208 including the updated status.

As a result of operations of the hub filter driver 200, the computing device 104 views the USB device 104 in a disabled state and does not engage with therewith; however, the emulation logic 208 obtains complete control over the USB device 104. Additionally, the hub filter driver 200 obtains the USB device data (e.g., the device descriptors) from the USB device 104, which are passed by the device client 109 to the emulation logic 208. Further, the hub filter driver 200 obtains the determination as to whether the USB device 104 is infected from the emulation logic 208 (e.g., obtains a "verdict" indicating a result of the detection process or "scan"). In response to the verdict, the hub filter driver 200 performs operations to allow or deny the USB device 104 to be configured with the computing device 102. For example, when the verdict indicates that the USB device 104 is infected, then no action needs to be taken by the hub filter driver 200; thus, the computing device continues to view the USB device 104 as being in a disabled state. However, when the verdict indicates that the USB device 104 is not infected, the hub filter driver 200 performs a soft reset of the USB device 104 and allows data exchange between the USB device 104 and the PnP manager 206 without interception.

Additionally, the USB hub driver 202 may be configured to perform operations upon execution by one or more processors including, managing USB hubs and corresponding ports, enumerating USB devices and other hubs attached to downstream ports, and creating physical device objects (PDOs) for the enumerated devices and hubs. The USB hub driver 202 may be loaded into the hub device stack as a function device object (FDO). In embodiments in which the operating system of the computing device (host OS) is MICROSOFT® WINDOWS®, the USB hub driver 202 may be known as "Usbhub3.sys" (in the USB 3.0 driver stack) or "Usbhub.sys" (in the USB 2.0 driver stack).

Additionally, the USB host controller 204 may be configured to perform operations upon execution by one or more processors including, initializing memory-mapped I/O (MMIO) registers and host memory-based data structures for controller hardware (e.g., xHCI), mapping transfer requests from upper layer drivers to Transfer Request Blocks, and submitting the requests to the hardware. The USB host controller 204 may also be configured to handle transfer completion events from the hardware and propagate such up the driver stack. The USB host controller 204 may be loaded into the hub device stack as an FDO. In embodiments in which the host OS is MICROSOFT® WINDOWS®, the USB host controller 204 may be known as "Usbxhci.sys" (in the USB 3.0 driver stack).

The PnP manager 206 may be an instance of a common PnP manager such as that provided as part of a WINDOWS® operating system and is configured to provide the support for "plug-and-play" functionality, which includes performing peripheral device detection and enumeration, processing addition or removal of peripheral devices, and/or installing new devices and corresponding driver packages.

FIG. 2A also provides further detail as to the device analysis subsystem 108 of the device security system 106. In particular, the device analysis subsystem 108 is shown to include an activity tracking logic 208, an activity analysis logic 210, a signature/machine learning (ML) database 211, and an emulation logic 212. Specific operations performed by each logic module will be discussed in detail below and with reference to FIGS. 2B-7. In some embodiments, the emulation logic 212 may, upon execution of one or more processors, perform certain operations resulting in emulation of the USB device 104. For instance, the emulation may include a device stack build operation for the USB device 104 based on received USB device data (e.g., a device descriptor). In some embodiments, and as illustrated in FIG. 2B, the emulation logic 212 may be implemented as a hypervisor and one or more virtual machines.

As noted, the emulation logic 212 of FIG. 2A may be deployed as a hypervisor and one or more virtual machines (FIG. 2B). However, in other embodiments, the emulation logic 212 may be comprised of instructions that, upon execution by one or more processors, receive data transmissions that are intercepted from the USB device 104 by any of the device client 109, the hub filter driver 200, the USB hub driver 202, or the USB host controller 204. Namely, the data provided by the USB device 104 is intercepted from being received by the PnP manager 206 and routed to the emulation logic 212. The emulation logic 212 may perform an analysis on the data (e.g., a device descriptor, a device descriptor stack, a URB, a payload, etc.) and provide a response thereto. The response generated by the emulation logic 212 is then provided back to the USB device 104 by way of the device client 109 (thus, prevent the PnP manager 206 from having any knowledge of communications to/from the USB device 104). Thus, in some embodiments, emulation of the detection, enumeration, configuration, and other processing includes data continuously intercepted from the USB device 104, passed to and analyzed by the emulation logic 212, and a response being provided from the emulation logic 212 to the USB device 104.

In some embodiments, the analyses performed by the emulation logic 212 on the data intercepted from the USB device 104 may include heuristics, signature detection (which then triggers a predetermined response), and/or utilization of a trained machine learning model to provide a prediction as to a response to be provided to the USB device 104. In embodiments in which a machine learning model is utilized, a training process is performed prior to insertion of the USB device 104, where the training process includes obtaining training data comprised of historical data provided by USB devices, responses provided by a PnP manager, and metadata such as operating system, USB device information, and other configuration data. The training data is featurized, optionally labeled (e.g., malicious or benign), and providing as input to a machine learning algorithm, the execution of which results in the trained machine learning model). In deploying the model, similar data is provided to the model (e.g., data provided by the USB device 104, USB device data (e.g., version, speed, etc.), operating system details of the computing device 102, etc.), which are featurized and analyzed by the model. Based on the featurized input, the model provides a prediction as to a response to be provided to the USB device 104 (e.g., where the predictions may indicate the most likely response that the PnP manager 206 would provide given the particular data from the USB device 104 with the current configurations).

Referring to now FIG. 2B, a block diagram illustrating the networking environment of FIG. 2A featuring the device security system implemented in cloud computing resources and emulation logic implemented as a hypervisor and one or more virtual machines is shown in accordance with some embodiments. It should be understood that the components illustrated in detail in FIG. 2B are also present in alternative deployments of the device security system 106, such as when the device security system 106 is deployed on on-prem resources 114 (FIG. 1B) and on the computing device 102 itself (FIG. 1C). Thus, the discussion of the operations performed by device client 109, the hub filter driver 200, the USB hub driver 202, the USB host controller 204, and the device security system 106 with reference to FIG. 2B applies equally to the alternative deployments illustrated in FIGS. 1A and 1C.

As noted, the emulation logic 212 of FIG. 2A is illustrated in FIG. 2B as being deployed as a hypervisor 212A and one or more virtual machines $214_1$-$214_M$ (where M≥1). The hypervisor 212A is configured to perform multiple sets of operations including resuming a virtual machine snapshot of a virtual machine when new USB device information (e.g., a device descriptor and/or device stack information) is received. In some embodiments, a virtual machine snapshot is a copy of the virtual machine's disk file (VMDK) at a given point in time that may be used to restore the virtual machine to a particular point in time when a failure or system error occurs.

A second set of operations performed by the hypervisor 212A includes emulating a USB insert action with a virtual machine 214 when new USB device information is received. Specifically, when a new USB device 104 is inserted into the computing device 102, information indicating insertion of the new USB device 104 into the computing device 102 is provided to the hypervisor 212A (e.g., a device descriptor or other indication of insertion) and the hypervisor creates a USB device insert event. The USB device insert event is provided to the USB hub driver 202 via a virtual USB host controller, resulting in the passage of a I/O manager API ("IoInvalidateDeviceRelations") to the PnP manager 206. After the USB hub driver 202 creates a new physical device object (PDO) for the newly inserted USB device and creates hardware IDs and compatibility IDs from the USB device descriptors, the guest OS of the virtual machine 214 initiates a device stack build operation with the device descriptor of the USB device 104. The hypervisor 212A then exchanges URBs with the newly inserted USB device. As completed URBs are provided to the hypervisor 212A and VM 214 instead of the PnP manager 206 (i.e., the host computing device), any activities that would typically be performed as a result of the completed URB are done within the VM 214.

A third set of operations performed by the hypervisor 212A includes enabling the activity tracking logic 208 to monitor and record the activities performed within the VM 214 as well as the URBs exchanged with the device client 109. In some embodiments, the activity analysis logic 210 provides the device client 109 with a determination as to whether the USB device is infected (e.g., performs anomalous or malicious operations) following performance of analyses of the activities and URBs. In other embodiments, the hypervisor 212A may provide the determination to the device client 109.

A fourth set of operations performed by the hypervisor 212A includes reverting the virtual machine 214 back to the virtual machine snapshot once the virtual machine 214 finishes the analysis and collection of information regarding the device behavior (e.g., monitoring of the operations performed or caused by USB device 104). If the USB device 104 is not infected (e.g., anomalous or malicious operations were not observed), then the virtual machine 214 is reverted to the VM snapshot immediately prior to receipt of the new device information. In some instances, the virtual machine 214 is reverted back to the VM snapshot regardless of whether the USB device 104 is determined to be infected or clean.

Additionally, as illustrated through the instantiation of a plurality of virtual machines, the hypervisor 212A supports the analyses of multiple USB devices 104 in a concurrent manner (e.g., at least partially overlapping in time).

The communications 218, 220, 222, and 224 illustrated in FIG. 2B represent data exchanges including device descriptors (218), URBs transferred to the USB device 104 from the hypervisor 212A and vice versa (220, 222), and results of analyses of the processing of the USB device 104 by the hypervisor 212A. Details of these communications are discussed in further detail with respect with the operational workflows of FIGS. 3-7.

2. Operational Workflows

Figure 3:
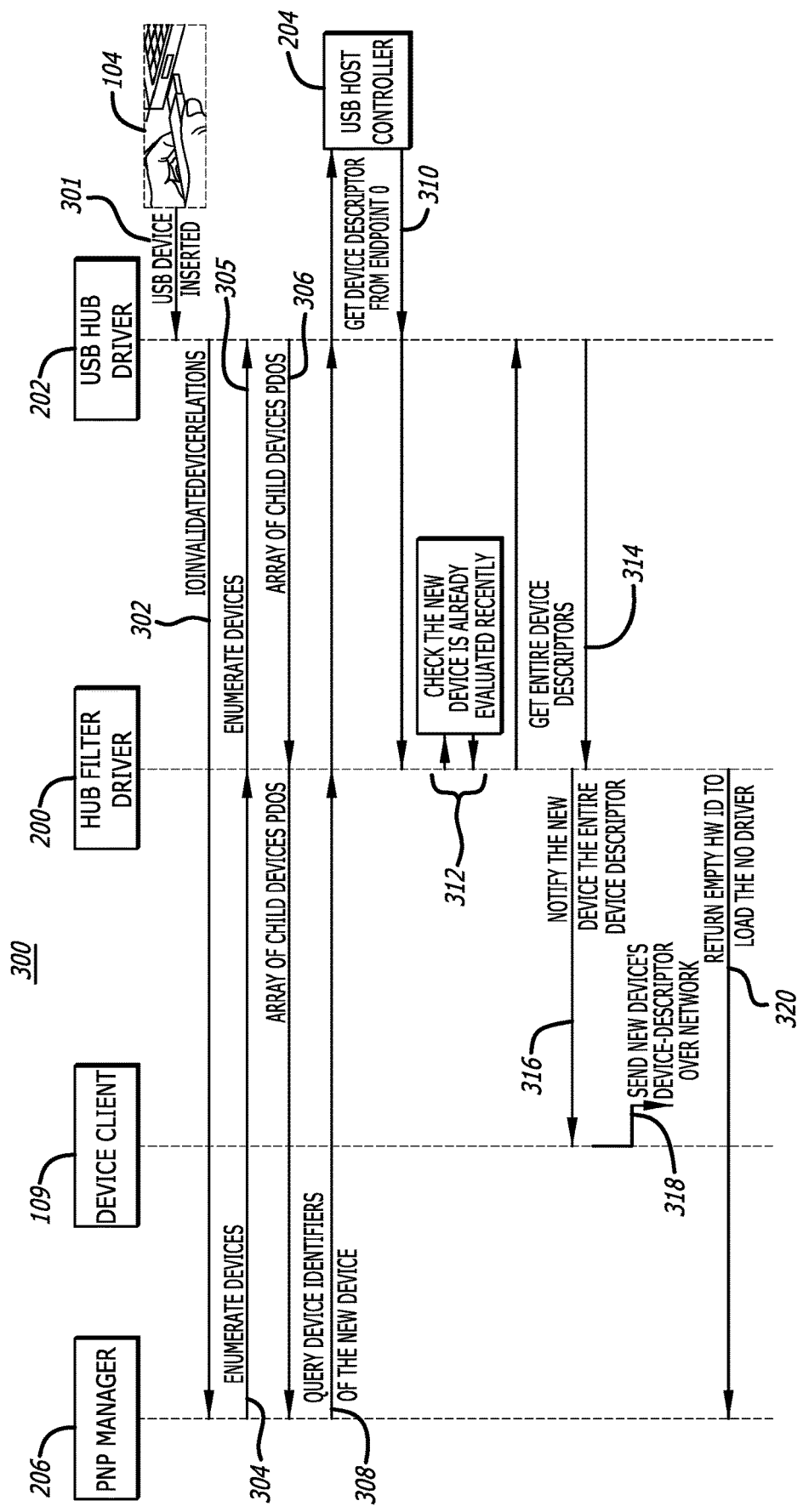
FIG. 3 is a workflow of exemplary operations performed in detecting the connection of a peripheral device to a computing device in accordance with some embodiments.
Figure 4:
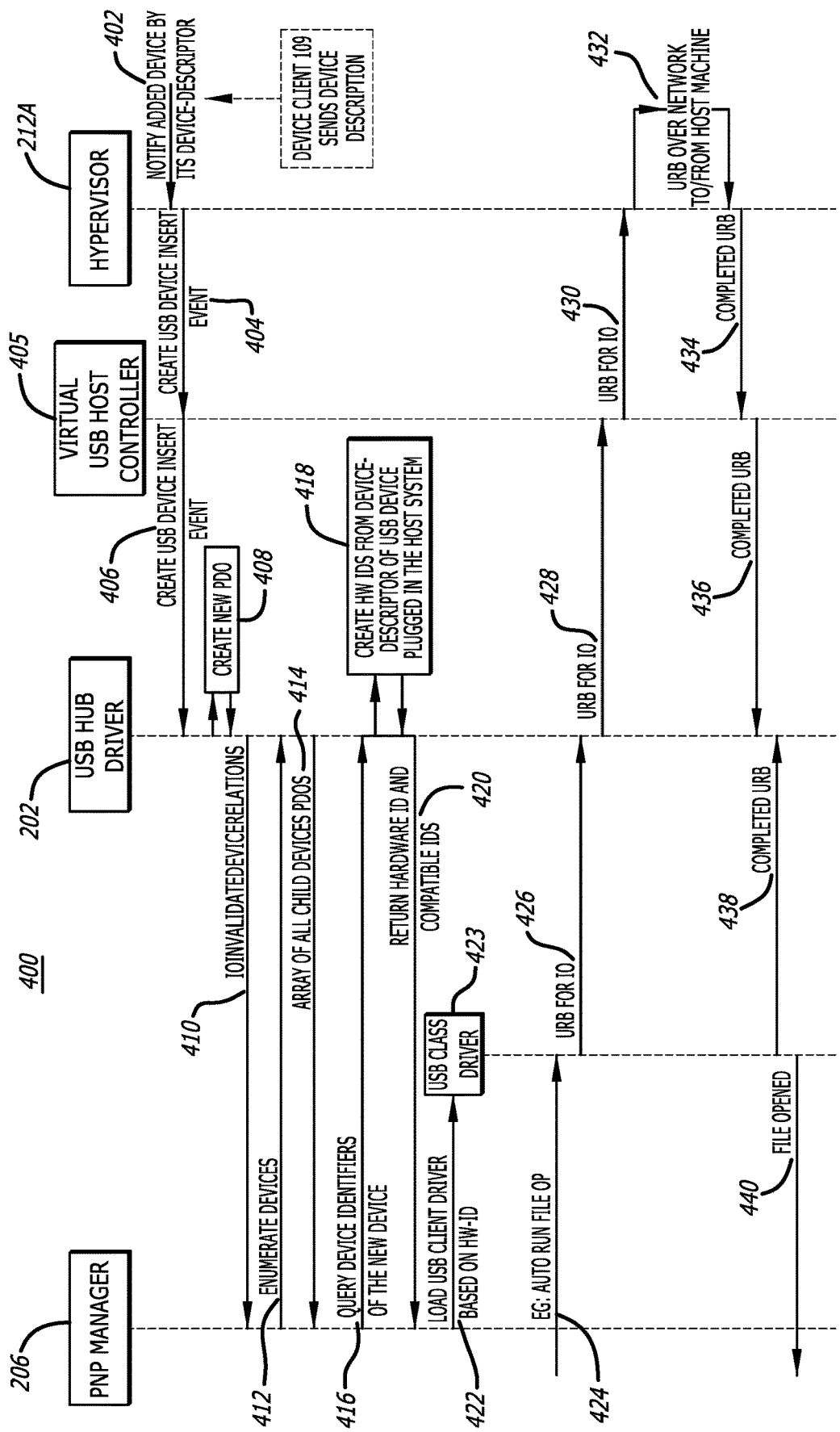
FIG. 4 is a workflow of exemplary operations performed in redirecting the configuration and detonation of the peripheral device to a sandboxed environment in accordance with some embodiments.
Figure 5:
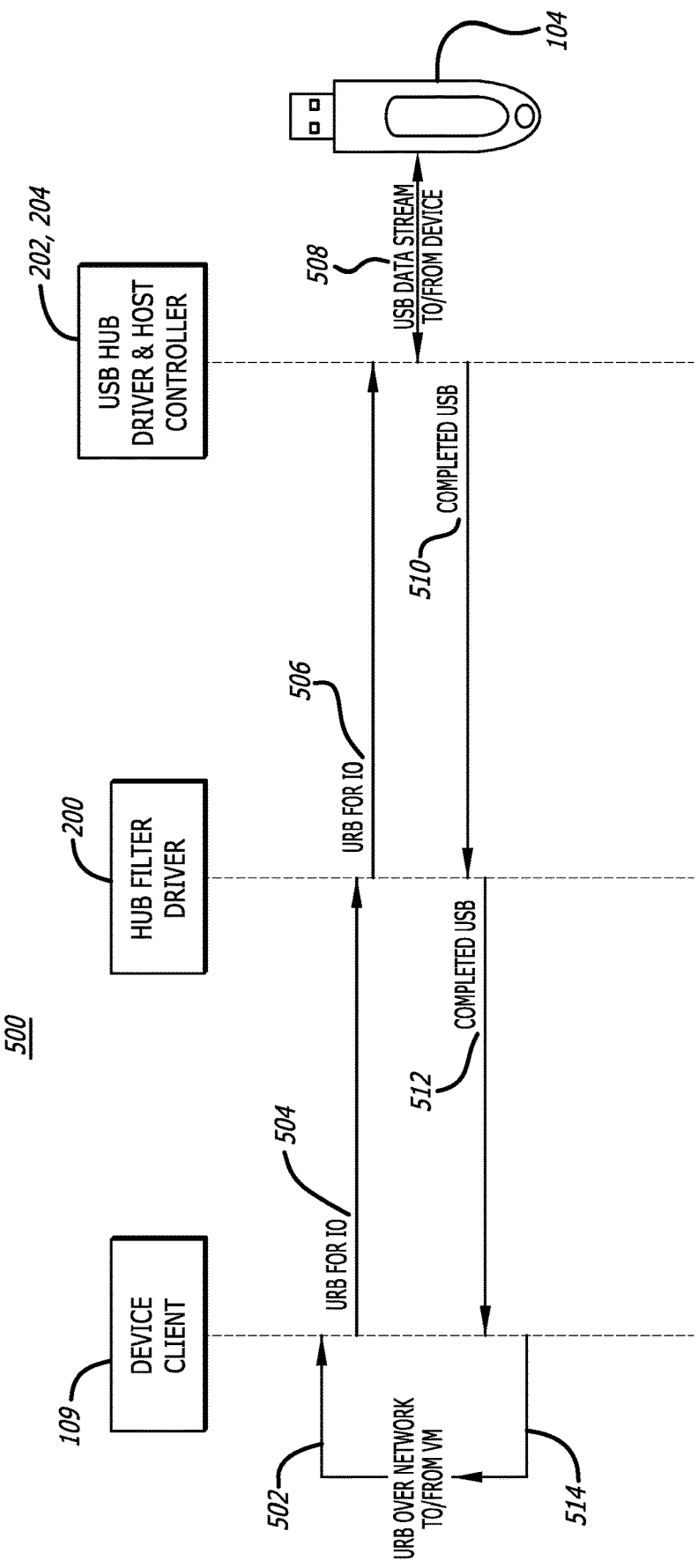
FIG. 5 is a workflow of exemplary operations performed in accessing the peripheral device from the sandboxed environment in accordance with some embodiments.

As has been discussed above, one illustrative implementation of the detecting anomalous activities of a USB device includes detection of such anomalous activities when a USB device is coupled with a computing device. One example implementation is illustrated collectively through FIGS. 3-7, where each of the FIGS. 3-7 provides an illustrative workflow of operations performed in a particular aspect of the detection process. FIG. 3 illustrates operations performed in detecting the connection of a USB device to a computing device while FIG. 4 illustrates operations performed in redirecting the configuration and detonation of the USB device to a sandboxed environment. FIG. 5 illustrates operations performed in accessing the USB device from the sandboxed environment and FIGS. 7-8 illustrate operations performed following a determination as to whether the USB device is clean or infected (e.g., has performed anomalous activities).

A. Detecting Connection of a Peripheral (USB) Device

Referring to now FIG. 3, a workflow of exemplary operations performed in detecting the connection of a peripheral device to a computing device is shown in accordance with some embodiments. The workflow 300 illustrates a set of operations performed by a plurality of components. In some embodiments, the illustrated operations may be performed by different components or components that are combined into a single component. In some instances, operations may be performed in a different order or may be performed concurrently with other operations.

The workflow 300 begins when a USB device is inserted into a peripheral (USB) port of a computing device (e.g., the computing device 102) (operation 301). The USB hub driver 202 detects the newly inserted USB device and calls the I/O manager API ("IoInvalidateDeviceRelations"), which is passed to the PnP manager 206 (operation 302). In response, the PnP manager 206 sends an I/O Request Packet (IRP) to the hub filter driver 200 (user mode) to enumerate the peripheral devices within the USB hub device stack (operation 304). The hub filter driver 200 dispatches the IRP to the USB hub driver 202 (kernel mode) (operation 305). The IRP is completed by the USB hub driver 202, which returns an array of physical device objects (PDOs) that correspond to the peripheral devices plugged into the computing device to the hub filter driver 200 and the PnP manager 206 (operation 306).

Subsequently, the PnP manager 206 identifies the PDO for the newly inserted USB device from the PDO array and transmits an IRP querying the device identifiers of the USB device in the USB device stack to the USB host controller 204 via the hub filter driver 200 (operation 308). Based on the device identifiers, the driver for the USB device will be loaded. In some embodiments, the device identifiers include a hardware ID and compatible IDs. More specifically, the hub filter driver 200 dispatches the IRP to the USB host controller 204 and the IRP is completed through the return of the hardware ID and compatibility IDs to the hub filter driver 200 (operation 310).

The hub filter driver 200 then queries its internal cache for the device reputation using the hash of device-descriptor as the primary key (e.g., to determine if the USB device was recently evaluated) and query's the USB hub driver 202 for the USB device's device-descriptor (operations 312, 314). In some embodiments, the operations 312, 314 may occur concurrently. While in other embodiments, the operations may occur in any order.

Following the querying of the internal cache for the device reputation (operation 312), when the device is marked clean, the completed IRP is returned to the PnP manager 206 without any alteration and the class drivers may be loaded for configuration of the USB device (not shown). However, if the USB device reputation is marked as malicious, the hub filter driver 200 will alter the completed IRP by replacing the device identifiers with an empty hardware ID and unknown compatibility ID ("USB\UNKNOWN") (operation 320). The PnP manager's completion routine of this IRP will fail to install any driver to this device. Thus, the device is disabled completely.

When the device reputation is unknown or is marked as malicious (at operation 312), the device descriptor and the host OS information such as, for example, WMI class Win32_OperatingSystem, are sent to the hypervisor 212A of the device analysis system 108 via the device client 109 (operations 316, 318). The transmission is via the secure connection referenced above, which, in some embodiments, may be over a network (e.g., when the device analysis system 108 is operating on on-prem resources 114 or on the cloud 101). Thus, until the device analysis system 108 returns a verdict of clean or the USB device was recently marked as clean, the USB device remains in a disabled state.

B. Redirection to a Sandboxed Environment

Referring to FIG. 4, a workflow of exemplary operations performed in redirecting the configuration and detonation of the peripheral device to a sandboxed environment is shown in accordance with some embodiments. The workflow 400 illustrates a set of operations performed by a plurality of components. In some embodiments, the illustrated operations may be performed by different components or components that are combined into a single component. In some instances, operations may be performed in a different order or may be performed concurrently with other operations. Typically, the operations of workflow 400 follow the operations of the workflow 300.

When the hypervisor 212A of the device analysis system 108 receives a new USB device event from an instance of a device client 109, the hypervisor 212A instantiates ("spins up") a virtual machine (VM), where the VM configurations (template) will be chosen based on the host OS information (e.g., WMI class Win32_OperatingSystem, see operations 314-318 of the workflow 300). The hypervisor 212A then creates a virtual USB insert event for a virtual USB host controller within the VM, which will in turn create a new USB device plug-in event in the virtual USB hub device stack (operation 404).

The virtual USB host controller 405 processing within a virtual machine 214 provides the create USB device plug-in event to the USB hub driver 202, which creates a new PDO (operations 406, 408).

The USB hub driver 202 then calls the I/O manager API IoInvalidateDeviceRelations, which is passed to the PnP manager 206 (operation 410). This causes the PnP manager 206 to transmit an I/O Request Packet (IRP) to the USB hub driver 202 via the hub filter driver 200 to enumerate the peripheral devices within the USB hub device stack (operation 412). The USB hub driver 202 returns an array of PDOs and the PnP manager 206 then queries the USB hub river 202 for device identifiers (operations 414, 416). In response to the query for the device identifiers, the USB hub driver 202 creates the exact hardware ID and compatible IDs that were created at the computing device during the device plug-in and returns the same to the PnP manager 206 (operations 418, 420). Upon receiving the device identifier, the PnP manager 206 loads the USB client driver (e.g., USB class driver 423) for the newly inserted USB device (operation 422). In some embodiments, the client driver may be a USB class function driver.

The PnP manager 206 may instruct an operation be performed by the USB device (e.g., a file open operation), such that the instruction is provided to the USB class driver 423 (operation 424). The USB class driver 423 then provides the instructions for the operations to the virtual USB device stack operating in the virtual machine 214 as a USB request block (URB) (operations 426-430). The URB is then routed to the actual USB device plugged into the computing device and a completed URB is returned to the hypervisor 212A, where deployment of any actions that would be performed by the USB device may take (operation 432). Thus, any malicious activity of the USB device will be safely detonated with in the VM 214. The result of the operation (e.g., the deployment of the USB device operations) is sent back to the USB client driver 423 and the PnP manager 206 as a completed URB (operations 434-440). Additional details with respect to accessing the USB device from the virtual machine 214 are discussed below with respect to FIGS. 5-7.

C. Accessing the Peripheral (USB) Device from the Sandboxed Environment

Referring to FIG. 5, a workflow of exemplary operations performed in accessing the peripheral device from the sandboxed environment is shown in accordance with some embodiments. The workflow 500 illustrates a set of operations performed by a plurality of components. In some embodiments, the illustrated operations may be performed by different components or components that are combined into a single component. In some instances, operations may be performed in a different order or may be performed concurrently with other operations. Typically, the operations of workflow 500 follow the operations of the workflow 400.

On the computing device into which the USB device is plugged, the hub filter driver 202 receives a URB submitted by the client driver loaded inside the VM 214 (e.g., the USB class driver 423 of FIG. 4) via the device client 109 (operations 502, 504). This URB is submitted to the USB device stack via the USB hub driver 202 and/or USB host controller 204 such that the completed URB is sent back to the VM 214 via the hub filter 200 and the client device 109 (operations 510-514). As a result, the newly inserted USB device may be perceived as being attached to the VM 214 as any operations resulting from the completion of a URB are performed in the VM 214.

In some embodiments, the completed URB and a payload provided by the USB device 104 are intercepted by the device client 109 processing on the computing device 102. The URB and payload are sent to the VM 214, and specifically, the operating system processing within the VM 214. A driver operating within the VM 214 intercepts any data or communication from the operating system of the VM 214 that is responsive to the completed URB and/or reading or execution of the payload. In some embodiments, the hypervisor intercepts the data or communication responsive to the completed URB and/or reading or execution of the payload. In turn, the communication or data is provided to the device client 109 on the computing device 102, which in turn provides the communication or data to the USB device 104 as "detonation results."

As an illustrative example, when the USB device is malicious, it will cause performance of the malicious activity in the VM 214 in response to certain URBs. For instance, a USB device infected with well-known malware referred to as "Rubber Ducky" will act like a keyboard device in which the malware (e.g., malicious firmware) will send a sequence of keystrokes as soon as it is plugged in. These keystrokes can run a PowerShell script which will alter the firewall settings, open a backdoor to communicate to download the payload from a command and control (CnC) server, etc. The payload could be ransomware, which could start encrypting files and other attached drives. However, in embodiments of the disclosure, the detonation of the Rubber Ducky occurs within the VM 214 where the activity of the system is monitored by activity tracking logic 208 of the device analysis system 108 and then analyzed by the activity analysis logic 210.

As the virtual machine 214 is processing and detonating activities of the newly inserted USB device, the activities and URBs exchanged between the hypervisor 212A/VM 214 and the client device 109/USB device 104 are monitored (and optionally recorded) by the activity tracking logic 208. In some embodiments, the hypervisor 212A permits the activity tracking logic 208 access to the virtual machine 214 to obtain certain data such as log data and state data.

The activity analysis logic 210 may perform analyses on the monitored data to determine whether such data indicates that the USB device is infected (e.g., is a malicious USB device). In some embodiments, the activities and URBs may be compared to predetermined signatures that may have been developed through experiential knowledge or through labeling of previously obtained log data, state data, or URBs from other USB devices determined to have been malicious. For example, predetermined signatures may be stored in the signature/ML database 211 may be accessed for comparison with the obtained log data, state data, and/or URBs. In some embodiments, a signature may represent a single log entry (e.g., noting a particular event occurred such as an anomalous number of keystrokes recorded in a predetermined time period such as one minute) or a combination of log entries that together indicate anomalous or malicious behavior.

In some embodiments, a signature may represent a single URB, a set of URBs, or a state of the VM 214. Another example may include detecting an anomalous configuration of a USB device, e.g., a USB Device acting as a combination of keyboard, a mouse, a network adapter, and/or as a mass storage device. This may be detected through reviewing a log entry if configuration detail is disclosed therein and/or a state of VM 214, which would include configuration data of any attached USB devices.

In other embodiments, the analyses may include utilization of machine learning techniques including processing of obtained log data, state data, and/or URBs by a trained machine learning model configured to provide a prediction as to whether the input data (any combination of obtained log data, state data, and/or URBs) indicates that the USB device is infected. Machine learning models may also be stored in the signature/ML database 211 and may be trained on training data that includes previous (historical) log data, state data, and/or URBs obtained from processing of other USB devices. In some embodiments, the training data may be labeled by a subject matter expert (e.g., resulting in supervised learning) while in other embodiments, the training data may not be labeled (e.g., resulting in unsupervised learning). A mix of labeled and unlabeled training may be utilized in semi-supervised learning. Examples of machine learning algorithms utilized to generate a machine learning model may include, but are not limited or restricted to, linear regression, logistic regression, naïve bayes, etc.

D. Post-Determination Operations

Figure 6:
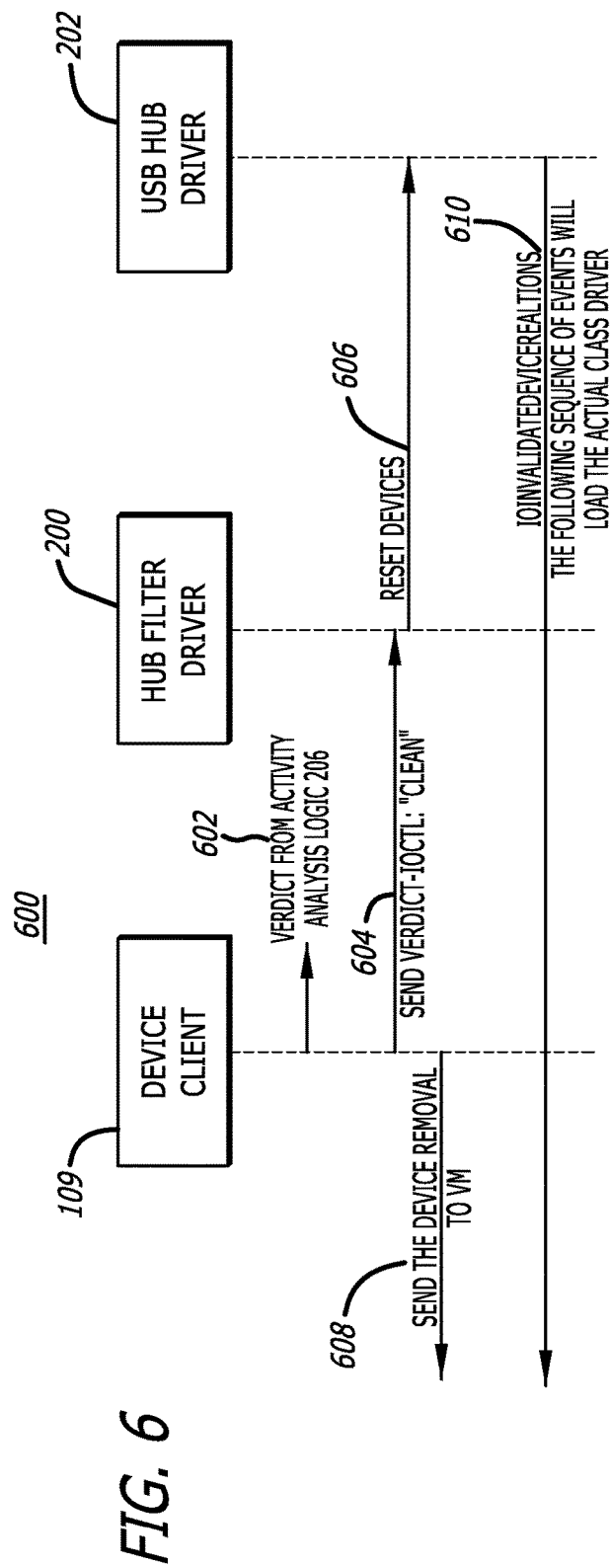
FIG. 6 is a workflow of exemplary operations performed following a determination that the peripheral device is clean in accordance with some embodiments.
Figure 7:
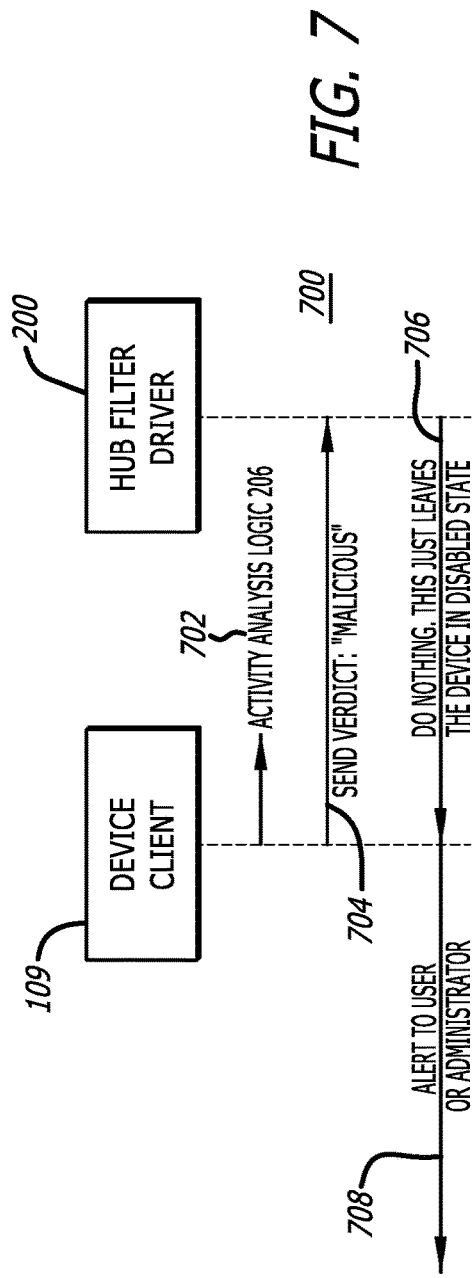
FIG. 7 is a workflow of exemplary operations performed following a determination that the peripheral device is infected in accordance with some embodiments.

Referring to FIG. 6, a workflow of exemplary operations performed following a determination that the peripheral device is clean is shown in accordance with some embodiments. The workflow 600 illustrates a set of operations performed by a plurality of components. In some embodiments, the illustrated operations may be performed by different components or components that are combined into a single component. In some instances, operations may be performed in a different order or may be performed concurrently with other operations. Typically, the operations of workflow 600 follow the operations of the workflow 500.

When the activity analysis logic 210 of the device analysis system 108 determines that the USB device is not infected, e.g., the monitored activities were not determined to be anomalous or malicious, the determination (or "verdict") is provided by the activity analysis logic 210 to the device client 109, which provides the verdict to the hub filter driver 200 via a IOCTL signal (VERDICT-IOCTL: "CLEAN"). The hub filter driver 200 also provides a USB device reset URB to the USB device stack (USB hub driver 202) (operations 602, 604). Receipt of a clean or uninfected verdict and the USB device rest URB causes the hub filter driver 200 to instruct the USB hub driver 202 to rest at least the newly inserted USB device, which results in virtual operations of device removal and re-plugin (operation 606). Additionally, the device client driver 109 (or the hub filter driver 200) transmits a signal to the hypervisor 212A to remove the device from the VM 214.

In response to the receipt of the clean verdict IOCTL signal, the USB hub driver 202 performs operations corresponding to detection of a newly inserted USB device by calling the I/O manager API ("IoInvalidateDeviceRelations"), which is passed to the PnP manager 206 (operation 610). The PnP manager 206 then performs the standard process for recognizing and enumerating the USB device without interception of any data exchange between the USB device and the PnP manager 206 by the device client 109 or the hub filter driver 200.

Referring to FIG. 7, a workflow of exemplary operations performed following a determination that the peripheral device is infected is shown in accordance with some embodiments. The workflow 700 illustrates a set of operations performed by a plurality of components. In some embodiments, the illustrated operations may be performed by different components or components that are combined into a single component. In some instances, operations may be performed in a different order or may be performed concurrently with other operations. Typically, the operations of workflow 700 follow the operations of the workflow 500.

When the activity analysis logic 210 of the device analysis system 108 determines that the USB device is infected, e.g., the monitored activities were determined to be anomalous or malicious, the verdict is provided by the activity analysis logic 210 to the device client 109, which provides the verdict to the hub filter driver 200 via a IOCTL signal (VERDICT-IOCTL: "MALICIOUS") (operations 702, 704).

At this stage, the hub filter driver 200 does not perform operations to reset the USB device so that computing device continues to view the USB device as being in a disabled state, which prevents any drivers for the USB device being loaded onto the computing device and the exchange of any data (at least outside of the VM 214). In some embodiments, the hub filter driver 200 may not notify the hypervisor 212A so that processing of activities of the USB device within the VM 214 continues, which are monitored and analyzed. This may enable further observation and collection key indicators of anomalous or malicious behaviors. Finally, the device client 109 generates and transmits an alert to the user of the computing device and, optionally, to a system administrator (operation 708).

IV. Replay of Peripheral Device Anomalous Activities

As discussed above, peripheral devices, such as USB devices may include modified firmware that provides malicious payloads or causes anomalous operations on a computing device ("infected USB devices"). For example, an infected USB device may inject keystrokes or emulate a network adapter to aid in delivering malicious payloads or data exfiltration when inserted into a computing device such as a laptop or other personal computer. For organizations that perform penetration testing or security audits using security analysis systems (e.g., "automated penetration test frameworks"), testing whether infected USB devices are detected by their security systems currently cannot be performed without physically placing an infected USB device into a computing device for testing.

Thus, unless the organization is able to obtain an assortment of infected USB devices, the organization is unable to uncover potential gaps in their physical security controls or replicate hardware-based attacks of threat actors introducing infected USB devices into their networking environment. Even attempting to acquire an assortment of infected USB devices on a regular basis is both impractical and unfeasible from an organization standpoint and a solution is needed which will satisfy the organization's need to test their security analysis system against infected USB devices.

Some embodiments of the disclose provide systems and methods for recording processing of USB devices, capturing certain data from the processing, creating profiles of the captured data representing a USB device, and emulating the processing of a USB device through an emulation logic providing responses to a computing device and other data in accordance with the captured data of a device profile. Notably, any attacks captured during processing of the actual USB device may be emulated as well. By emulating a USB device through the USB device profile, an organization may perform penetration testing without the need of obtaining physical hardware USB devices. Embodiments may also extend to recording, creating profiles of, and emulating other devices such as peripheral devices that connect directly via a BLUETOOTH® protocol, a network adapter, or other susceptible interfaces.

1. Device Emulation System

Figure 8A:
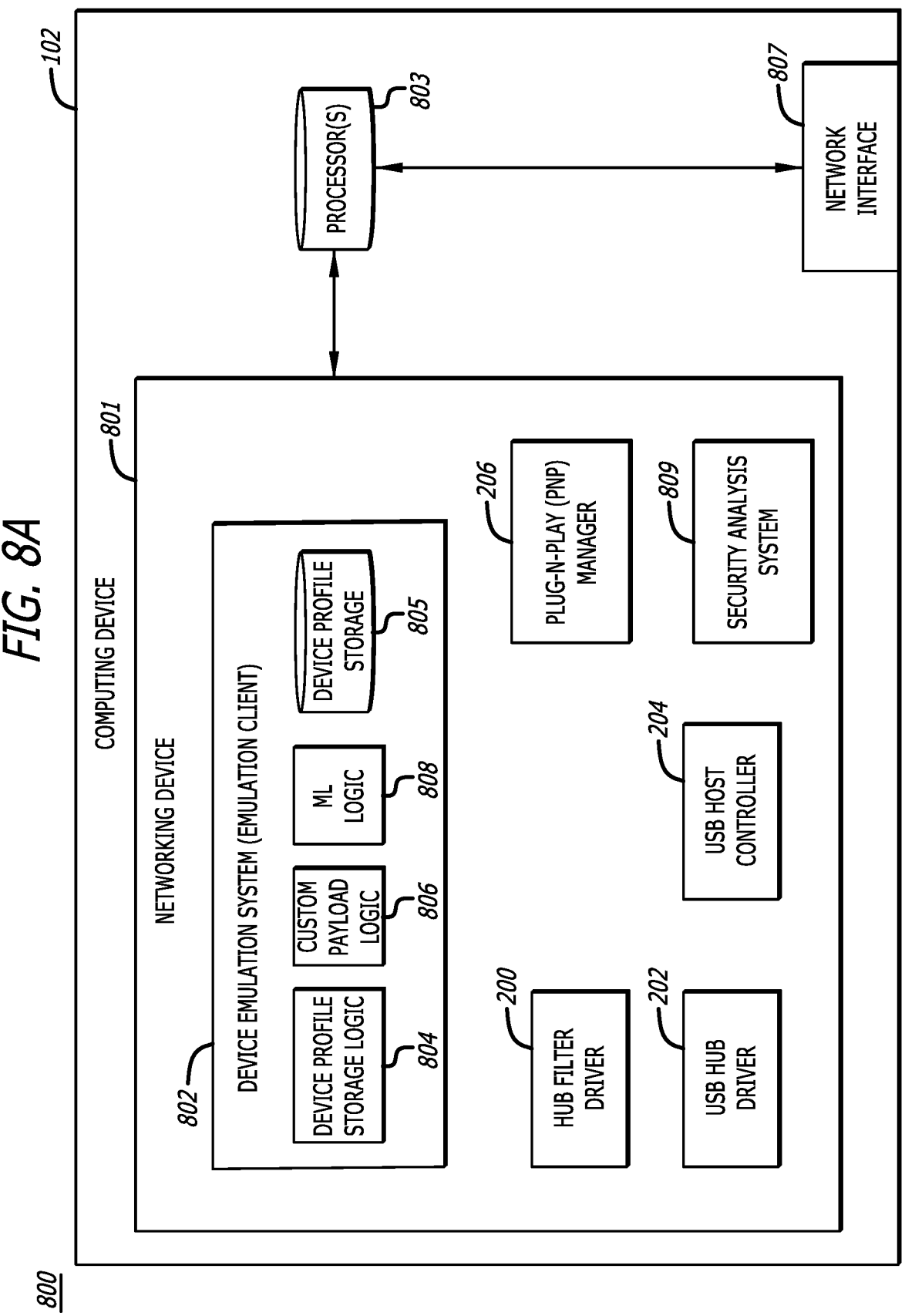
FIG. 8A is a block diagram illustrating a computing device operating within a networking environment and having an emulation client operating thereon in accordance with some embodiments.

Referring now to FIG. 8A, a block diagram illustrating a computing device 102 operating within a networking environment 800 and having a device emulation system ("an emulation client") 802 operating thereon is shown in accordance with some embodiments. Herein, the computing device 102 illustratively includes one or more hardware processors 803, a memory 801 (e.g., non-transitory, computer-readable medium), one or more network interfaces (referred to as "network interface(s)") 807. These components are at least partially encased in a housing, which is made entirely or partially of a rigid material (e.g., hardened plastic, metal, glass, composite, or any combination thereof) that protects these components from atmospheric conditions.

The hardware processor 803 is a multipurpose, programmable device that accepts digital data as input, processes the input data according to instructions stored in its memory, and provides results as output. One example of the hardware processor 803 may include an INTEL® x86 central processing unit (CPU) with an instruction set architecture. Alternatively, the hardware processor 803 may include another type of CPU, a digital signal processor (DSP), an ASIC, a field programmable gate array (FPGA), or the like. The computing device 102 may include various input/output (I/O) or peripheral device ports (not shown).

The network interface 807 may include a modem or one or more network ports containing the mechanical, electrical and/or signaling circuitry needed to connect the computing device 102 to a public or private network to thereby facilitate communications over the network. To that end, the network interface 807 may be configured to transmit and/or receive messages using a variety of communication protocols including, inter alia, TCP/IP and HTTPS.

The memory 801 may include a plurality of locations that are addressable by the hardware processor 803 and the network interface 807 for storing software (including software applications) and data structures associated with such software. Examples of the stored software include an emulation client 802, a hub filter driver 200, a USB hub driver 202, a USB host controller 204, and plug-and-play (PnP) manager 206, and a security analysis system 809. The emulation client 802 may include a plurality of sub-modules such as a device profile storage logic 804, a custom payload logic 806, and a machine learning (ML) logic 804. Further, a device profile storage 205 may be encompassed by the emulation client 802 as shown or may be stored separately on the storage 801 of the computing device 102 (or stored remotely and otherwise accessible to the emulation client 802).

In some embodiments, the emulation client 802, upon execution by the processors 803, may be configured to perform operations including providing a signal emulating the insertion of a peripheral device (e.g., USB device) into the computing device 102, accessing the device profile storage 805 and selecting a USB device profile, and exchanging data with applications, drivers, or other logic of the computing device 102 in accordance with the USB device profile thereby emulating a USB device. In one embodiment, the emulation client 802 provides an indication to the hub filter driver 200, the USB hub driver 202, and/or the USB host controller 204 that a USB device has been inserted, where the indication represents a change on a data line of a USB port (e.g., a voltage transition).

Upon detection of the emulated insertion, the computing device 102 ("the host device"), e.g., the PnP manager 202, requests the device descriptor of the USB device being emulated ("the emulated USB device"). The emulation client 802 intercepts the device descriptor request and responds with a device descriptor of the emulated USB device. In a typical enumeration process, the computing device 102 may set an address for the emulated USB device and again requests the device descriptor. In such an instance, the emulation client 802 again intercepts the request and responds with a device descriptor of the emulated USB device. Additional signals may be provided by the computing device 102 during an enumeration process of the emulated USB device, which are intercepted by the emulation client 802 and responses are provided accordingly (or actions are emulated accordingly). For instance, by emulating voltage on particular data lines, the emulation client 802 may provide an indication as to a speed of the emulated USB device.

The computing device 102 may also obtain an .INF file of the emulated USB device, which specifies particular device drivers for the emulated USB device. The computing device 102 loads the specified device drivers and configures the emulated USB device by providing URBs (discussed above). The emulation client 802 intercepts the URBs and provides a response in accordance with the USB device profile.

The computing device 102 may also communicate with the emulated USB device by providing or receiving data packets. In some embodiments, the USB device profile of the emulated device may include one or more custom payloads. In such instances, the emulation client 802 may provide the computing device 102 with the custom payloads. Additional operations performed by the emulation client 802 or variations of those discussed above may be evident during discussion of the methodologies set forth in FIGS. 9-12.

In some embodiments, the device profile storage logic 804, upon execution by the processors 803, may be configured to perform operations including creating a new device profile, associating a device descriptor (optionally, including an entire USB device descriptor structure) of a USB device with the device profile, associating data captured during processing (detecting, enumerating, configuring, or exchanging other data) of the USB device, and storing the device profile in the device profile storage 805. A USB device descriptor structure includes a plurality of fields including a length, device descriptor, USB specification number, device class, device subclass, device protocol, maximum packet size, vendor identifier, product identifier, device release number, index of manufacturer string descriptor, index of product string descriptor, index of serial number string descriptor, and/or number of possible configurations. The device descriptor structure and other captured data may be obtained through the methodologies discussed above, at least with respect to FIGS. 1A-7.

In some embodiments, the custom payload logic 806, upon execution by the processors 803, may be configured to perform operations including replicating a stored device profile and altering one or more aspects of the device profile. For instance, the custom payload logic 806 may alter, add, or remove a payload associated with a USB device profile. Other modifications to a device profile include alteration or one or more fields of the device descriptor structure.

In some embodiments, the ML logic 808, upon execution by the processors 803, may be configured to perform operations including obtaining training data such as stored USB device profiles, executing a machine learning algorithm providing training data as input, and generating a trained ML model that is configured to determine whether a USB device is infected.

Figure 8B:
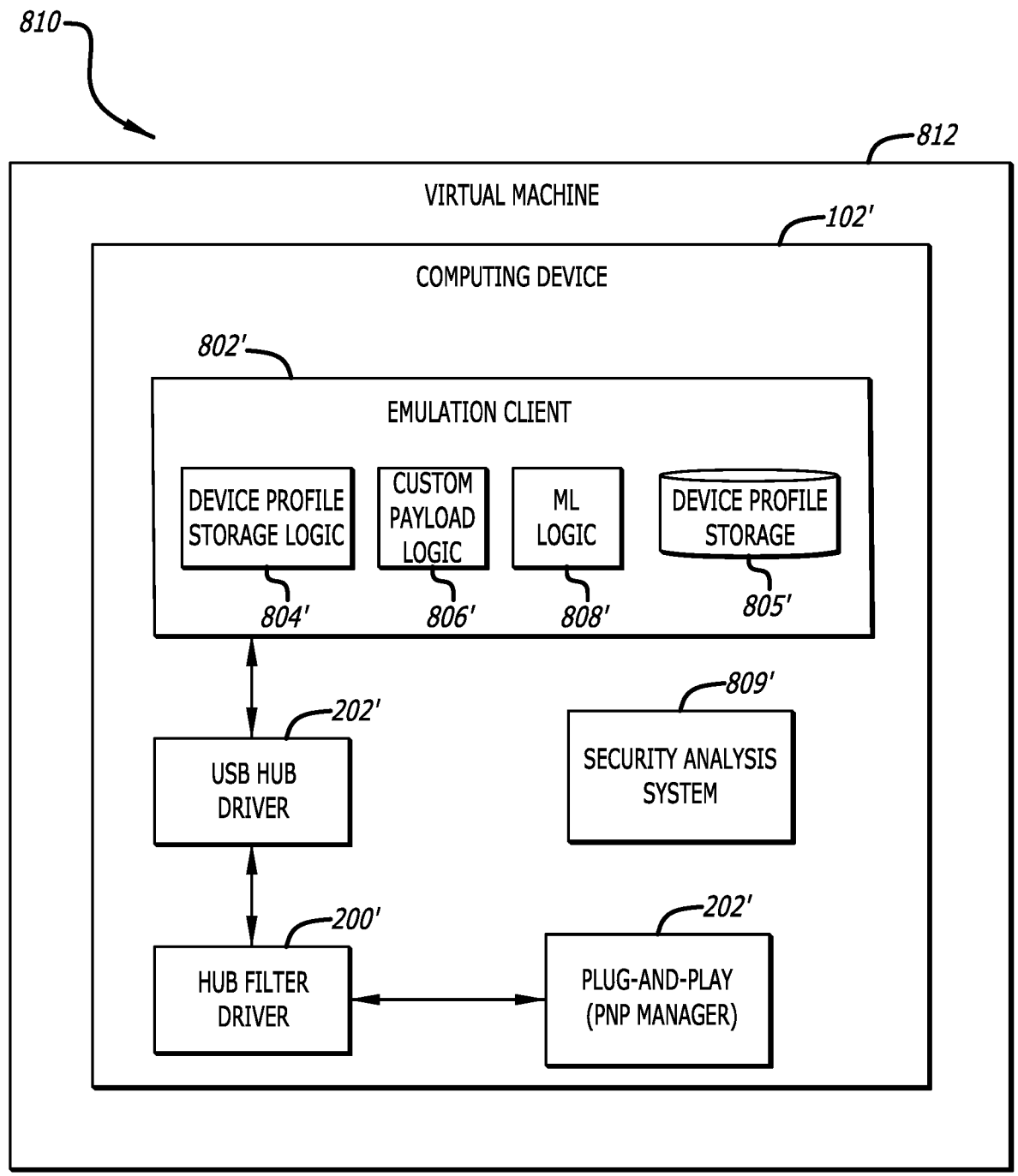
FIG. 8B is a block diagram illustrating a virtual machine operating within a networking environment where a virtual instance of the computing device of FIG. 8A is processing therein in accordance with some embodiments.

Referring now to FIG. 8B, a block diagram illustrating a virtual machine operating within a networking environment 810 where a virtual instance of the computing device of FIG. 8A is processing therein is shown in accordance with some embodiments. The networking environment 810 includes a virtual machine 812 that is processing a virtual instance of the networking device 102 ("computing device 102'"). FIG. 8B indicates a virtual instance of a component through the labeling the component with a "prime element (')." As shown, the computing device 102' includes virtual instances of the components illustrated in FIG. 8A. The computing device 102' and the emulation client 802' are configured to operate in the same manner as described above with respect to the computing device 102 and the emulation client 802 respectively.

As is understand, processing within virtual machines provides several advantages over processing on actual machines. For instance, a plurality of virtual machines may be instantiated quicker and for less cost than obtaining a plurality of actual machines. Additionally, the configurations of one or more of the virtual machines may be selected prior to instantiation such that the plurality of virtual machines may represent a plurality of configurations, such may not be easily accomplished or feasible using actual machines (e.g., combinations of hardware and software may be not easily accomplished or obtained due to an inability to obtain actual machines having certain physical hardware).

Further, when an error or infection occurs within a virtual machine, the virtual machine instance may be terminated and a new, clean virtual machine may be instantiated in a matter of seconds. However, such may require manual labor to wipe an actual machine and reconfigure or reinstall any software or applications. For at least these reasons, the use of virtual machines in emulating USB devices is particularly advantageous as many combinations of emulated USB devices and hardware/software configurations may be processed. As noted above, a security analysis system (the security analysis system 809 or 809') may be tested to determine whether the security analysis system is capable of detecting whether the emulated USB device is infected and, in response, generating a flag for an administrator.

In some instances, a plurality of virtual machines may be instantiated with the same hardware/software configurations including the emulation client 802', where the emulation client 802' is configured to emulate one or more USB devices on each of the plurality of virtual machines. Thus, the security analysis system 809' operating on each virtual machine instance may be tested to determine whether the security analysis system 809' is capable of detecting each emulated infected USB device. In other embodiments, variations in hardware/software configurations of virtual machine instances may be utilized.

2. Emulation Methodology Embodiment

Figure 9:
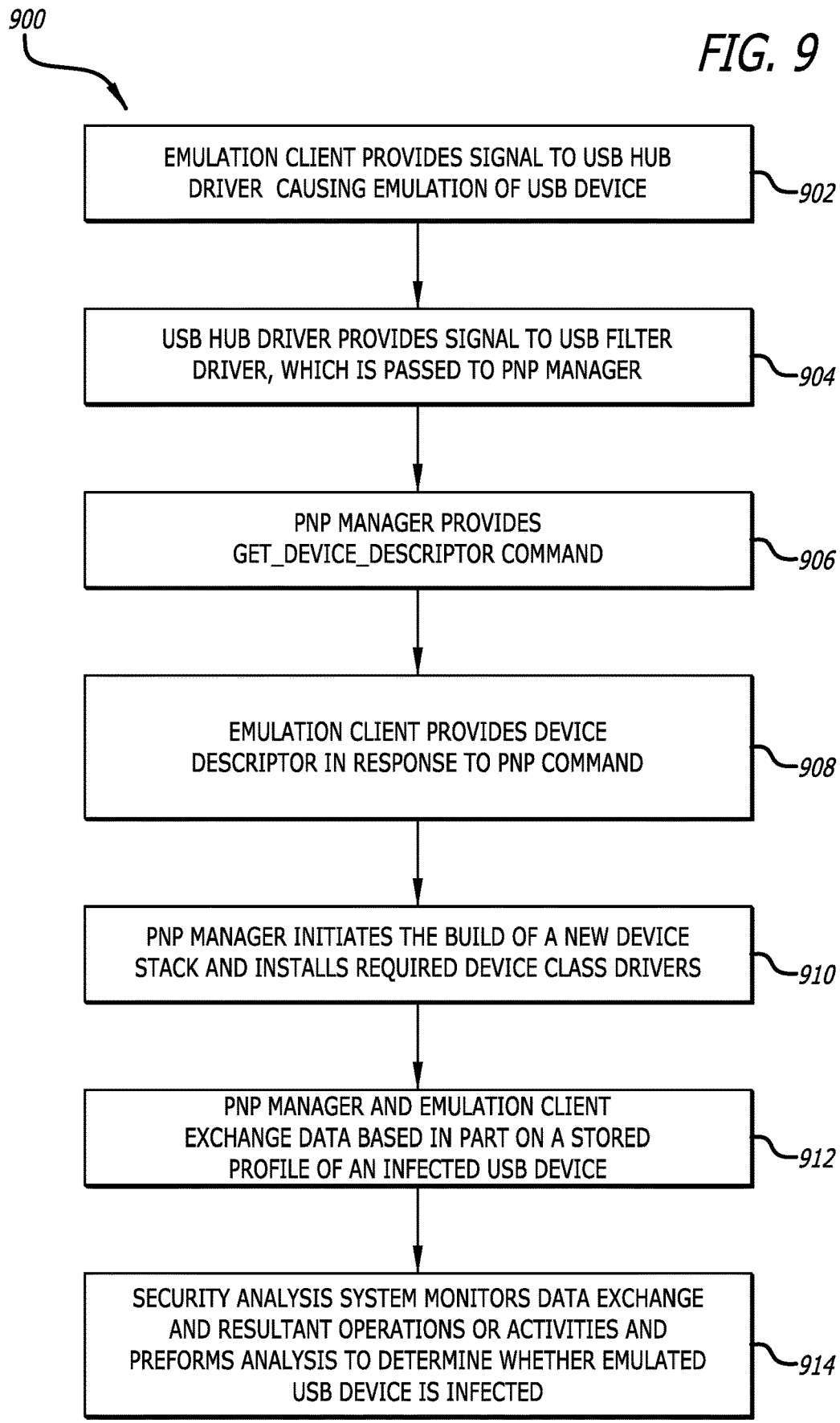
FIG. 9 is a flowchart illustrating a methodology of emulating insertion in and processing of a USB device to a computing device by an emulation device processing on the computing device in accordance with some embodiments.

Referring to FIG. 9, a flowchart illustrating a methodology of emulating insertion in and processing of a USB device to a computing device by an emulation device processing on the computing device is shown in accordance with some embodiments. Each block illustrated in FIG. 9 represents an operation performed in the method 900. It should be understood that not every operation illustrated in FIG. 9 is required. In fact, certain operations may be optional to complete aspects of the method 900. The discussion of the operations of method 900 may be done so with reference to any of the preceding figures.

The method 900 begins when an emulation client provides a signal to a USB hub driver causing emulation of a USB device (block 902). In some embodiments, the signal may be provided to a USB host controller, a hub filter drive, or other component operating on a computing device. The USB hub driver may provide the signal to a USB filter driver, which passes the signal to a PnP manager operating on the computing device (block 904). The PnP manager then begins an enumeration process of the USB device to be emulated ("emulated USB device") by providing a command to the USB port into which the emulated USB device is inserted as understood by the computing device (block 906). The command may be a GET_DEVICE_DESCRIPTOR (or GET_DESCRIPTOR) command.

The emulation client intercepts the command and provides a response that includes the device descriptor (block 908). The response may include additional information such as other fields in the device descriptor structure. Notably, the emulation client may access a device profile storage and provide the device descriptor and other data consistent with the device profile. As discussed above, the device profile includes the device descriptor structure of a USB device (or slightly altered as a custom device profile) and data captured during processing of the USB device. As a result, by providing responses to commands or requests from the computing device, the emulation client emulates the USB device on the computing device.

The PnP manager may initiate the build of a new device stack and install required device class drivers (block 910). A listing of the required device class drivers may be obtained by the PnP manager by obtaining an .INF file of the emulated USB device, which may also be stored as part of the USB device profile. The PnP manager and emulation client may then exchange additional data such as URBs or other data packets, where the emulation client continues to provide responses or data that is consistent with the USB device profile of the emulated USB device (block 912). In some instances, the emulated USB device may be an infected USB device.

During the processing of the emulated USB device, which may include detection, enumeration, configuration, and other data exchanges, a security analysis system may monitor the data exchanged as well as resultant operators or activities. The security analysis system may then perform an analysis to determine whether the emulated USB device is infected (block 914). In some examples, the analysis may include a comparison of the monitored data exchange and processing with a set of signatures of infected USB devices. Other examples may include comparison of the monitored data exchange and processing with a set of known indicators of compromise (IoCs). In yet other examples, the analysis may include utilization of machine learning techniques, such as deployment of a trained ML model that predicts whether the emulated USB device is infected based on input of the monitored data exchange and processing.

3. Custom Device Profile Generation Methodology

Figure 10:
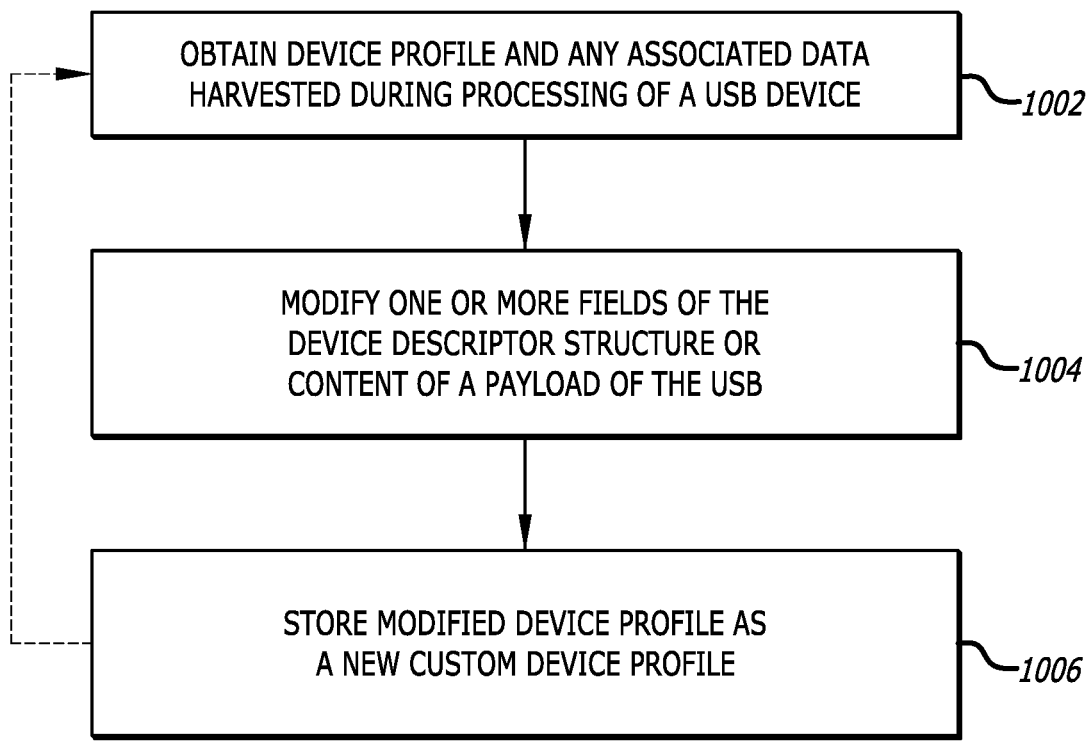
FIG. 10 is a flowchart illustrating a methodology of generating one or more custom peripheral device profiles in accordance with some embodiments.

Referring now FIG. 10, a flowchart illustrating a methodology of generating one or more custom peripheral device profiles is shown in accordance with some embodiments. Each block illustrated in FIG. 10 represents an operation performed in the method 1000. It should be understood that not every operation illustrated in FIG. 10 is required. In fact, certain operations may be optional to complete aspects of the method 1000. The discussion of the operations of method 1000 may be done so with reference to any of the preceding figures.

The method 1000 begins when a device profile is obtained along with any additional data harvested during processing of a USB device (block 1002). As discussed above, with respect to FIGS. 2A-7, a device analysis system 108 along with a device client 109 may operate to intercept a signal from a USB device that has been inserted into a USB port of a computing device and cause emulation of the computing device in response to insertion of the USB device. For instance, the device client 109 and/or device analysis system 108 may detect data on a data line of a USB port and provide the inserted USB with a request for a device descriptor, emulate the build of a new device stack and install of drivers (e.g., requesting the requisite data for doing so from the USB device) and further exchange data with the USB device such as URBs and additional data packets. During this emulation of a USB device inserted into the computing device, the data provided by the USB device is captured and stored in a device profile. In some examples, the method 1000 may utilize this device profile.

Once a USB device profile has been obtained, the contents of one or more fields of the device descriptor structure or contents of a payload are modified (block 1004). The modification may include removal, alteration, or addition. Following the modification, the modified device profile is stored as a new custom device profile (block 1006). In some embodiments, the method 1000 may be performed by the custom payload logic 806 of the emulation client according to a set of predefined rules.

4. Second Emulation Methodology Embodiment

Referring to FIG. 11, a flowchart illustrating a methodology of emulating a peripheral device in accordance with a stored peripheral device profile on either a host machine or a guest machine is shown in accordance with some embodiments. Each block illustrated in FIG. 11 represents an operation performed in the method 1100. It should be understood that not every operation illustrated in FIG. 11 is required. In fact, certain operations may be optional to complete aspects of the method 1100. The discussion of the operations of method 1100 may be done so with reference to any of the preceding figures.

The method 1100 begins when an emulation client accesses a device profile storage (block 1102). The method 1100 may then proceed in any of a plurality of options (block 1104-1108). A first option includes the emulation client providing a plurality of signals to a host machine, where each of the plurality of signals emulate a connection of a USB device (block 1104). A second option includes the emulation logic providing a plurality of signals to a guest machine (e.g., virtual machine) emulating the connection a plurality of USB devices (block 1106). A third option includes the emulation logic providing one or more signals to each of a plurality of guest machines where each signal emulates a connection of a USB device.

Following one or more of the options set forth in block 1104-1108, a USB hub driver of each host or guest machine to which a signal was provided detects the signal(s) and notifies a PnP manager of the respective host or guest machine (block 1110). Each respective PnP manager initiates a build of a new device stack and installs required device class drivers for each emulated USB device (block 1112). As discussed above, the PnP manager may request certain data from each emulated USB device, such as the device descriptor and obtain an .INF file. Additionally, each respective PnP manager may exchange further data with each emulated USB device (including during the detection, enumeration, and configuration processes), such as URBs (block 1114). As noted above, the exchange of data occurs through interception of commands/requests from the machine (e.g., the PnP manager) by the emulation client, where the emulation client provides a response or other data in accordance with a particular USB device profile.

During the processing of each emulated USB device, an instance of a security analysis system operating on each host or guest machine may perform an analysis of the processing of each emulated USB device resulting in a determine as to whether each emulated USB device is infected (block 1116).

5. Machine Learning Model Training Methodology

Referring now to FIG. 12, a flowchart illustrating a methodology of training a machine learning model to detect whether a peripheral device is infected is shown in accordance with some embodiments. Each block illustrated in FIG. 12 represents an operation performed in the method 1200. It should be understood that not every operation illustrated in FIG. 12 is required. In fact, certain operations may be optional to complete aspects of the method 1200. The discussion of the operations of method 1200 may be done so with reference to any of the preceding figures.

The method 1200 begins when training data is obtained that includes device profiles including USB device descriptor structures and data captured during processing of the USB devices (block 1202). Optionally, at least a portion of training data may be labeled (block 1204). For example, a subject matter expert may label a portion of the device profiles as being infected or benign (e.g., does not provide malicious/anomalous data or cause malicious/anomalous operations). The method 1200 proceeds with training of a machine learning (ML) model through execution of a ML algorithm using a first portion of the training data as input (block 1206). The trained ML model is configured to provide a prediction as to whether the USB device is infected. As is understood by those having ordinary skill in the art, the training data may be featurized prior to utilization as input. Following generation of the trained ML model, the model may be applied to a second portion of the training data to obtain predictions, where user feedback as to the accuracy of the predictions may be obtained and incorporated into training data for retraining (blocks 1208-1212, 1206). Upon completion of the training of the model, the trained ML model is stored and subsequently applied to a device profile of a subsequent USB device and data captured during the processing thereof (block 1214-1216).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for emulating processing of a peripheral device, the method comprising:
providing an insertion emulation signal to a computing device emulating insertion of the peripheral device to a port of the computing device, wherein the peripheral device is an emulated peripheral device;
intercepting a request for a device descriptor of the peripheral device from a plug-and-play (PnP) manager operating on the computing device;
providing the device descriptor of the peripheral device to the PnP manager, wherein the PnP manager is configured to enumerate the emulated peripheral device;
intercepting one or more Universal Serial Bus (USB) request blocks (URBs) from the PnP manager; and
responsive to each of the one or more URBs, providing a response to the PnP manager,
wherein at least one response to an intercepted URB of the one or more URBs provided to the PnP manager includes an anomalous or malicious payload.

2. The computerized method of claim 1, wherein the insertion emulation signal emulates a voltage transition on a data line of the port of the computing device.

3. The computerized method of claim 1, wherein the peripheral device adheres to a USB standard.

4. The computerized method of claim 1, wherein the device descriptor of an emulated peripheral device is retrieved from a device profile associated with the emulated peripheral device, and wherein the device profile includes each response provided to the PnP manager.

5. The computerized method of claim 4, wherein contents of the device profile are captured through monitoring of processing of the peripheral device prior to the provision of the insertion emulation signal.

6. A computerized method for emulating processing of a peripheral device, the method comprising:
providing an insertion emulation signal to a computing device emulating insertion of the peripheral device to a port of the computing device, wherein the peripheral device is an emulated peripheral device;
intercepting a request for a device descriptor of the peripheral device from a plug-and-play (PnP) manager operating on the computing device;
providing the device descriptor of the peripheral device to the PnP manager, wherein the PnP manager is configured to enumerate the emulated peripheral device;
intercepting one or more Universal Serial Bus (USB) request blocks (URBs) from the PnP manager; and
responsive to at least a first USB of the one or more URBs, providing a first response to the PnP manager, wherein the first response causes injection of keystrokes into the computing device.

7. A computing device comprising:
a processor; and
a non-transitory computer-readable medium having stored thereon instructions that, when executed by the processor, cause the processor to perform operations including:
providing an insertion emulation signal to a computing device emulating insertion of the peripheral device to a port of the computing device, wherein the peripheral device is an emulated peripheral device;
intercepting a request for a device descriptor of the peripheral device from a plug-and-play (PnP) manager operating on the computing device;
providing the device descriptor of the peripheral device to the PnP manager, wherein the PnP manager is configured to enumerate the emulated peripheral device;
intercepting one or more Universal Serial Bus (USB) request blocks (URBs) from the PnP manager; and
responsive to each of the one or more URBs, providing a response to the PnP manager,
wherein at least one response to an intercepted URB of the one or more intercepted URBs provided to the PnP manager includes an anomalous or malicious payload.

8. The computing device of claim 7, wherein the insertion emulation signal emulates a voltage transition on a data line of the port of the computing device.

9. The computing device of claim 7, wherein the peripheral device adheres to a USB standard.

10. The computing device of claim 7, wherein the device descriptor of an emulated peripheral device is retrieved from a device profile associated with the emulated peripheral device, and wherein the device profile includes each response provided to the PnP manager.

11. The computing device of claim 10, wherein contents of the device profile are captured through monitoring of processing of the peripheral device prior to the provision of the insertion emulation signal.

12. The computing device of claim 7, wherein a first response provided to the PnP manager in response to a first URB causes injection of keystrokes into the computing device.

13. A non-transitory computer-readable medium having stored thereon instructions that, when executed by one or more processors, cause the one or more processor to perform operations including:
 providing an insertion emulation signal to a computing device emulating insertion of the peripheral device to a port of the computing device, wherein the peripheral device is an emulated peripheral device;
 intercepting a request for a device descriptor of the peripheral device from a plug-and-play (PnP) manager operating on the computing device;
 providing the device descriptor of the peripheral device to the PnP manager, wherein the PnP manager is configured to enumerate the emulated peripheral device;
 intercepting one or more Universal Serial Bus (USB) request blocks (URBs) from the PnP manager; and
 responsive to each of the one or more URBs, providing a response to the PnP manager,
 wherein at least one response to an intercepted URB of the one or more URBs provided to the PnP manager includes an anomalous or malicious payload.

14. The non-transitory computer-readable medium of claim 13, wherein the insertion emulation signal emulates a voltage transition on a data line of the port of the computing device.

15. The non-transitory computer-readable medium of claim 13, wherein the peripheral device adheres to a USB standard.

16. The non-transitory computer-readable medium of claim 13, wherein the device descriptor of an emulated peripheral device is retrieved from a device profile associated with the emulated peripheral device, and wherein the device profile includes each response provided to the PnP manager, and wherein contents of the device profile are captured through monitoring of processing of the peripheral device prior to the provision of the insertion emulation signal.

17. The non-transitory computer-readable medium of claim 13, wherein a first response provided to the PnP manager in response to a first URB causes injection of keystrokes into the computing device.

* * * * *